US010681779B2

(12) United States Patent
Noro

(10) Patent No.: US 10,681,779 B2
(45) Date of Patent: Jun. 9, 2020

(54) HONEYCOMB STRUCTURE

(71) Applicant: NGK INSULATORS, LTD., Nagoya-Shi (JP)

(72) Inventor: Takashi Noro, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/214,493

(22) Filed: Dec. 10, 2018

(65) Prior Publication Data

US 2019/0191493 A1 Jun. 20, 2019

(30) Foreign Application Priority Data

Dec. 15, 2017 (JP) ................................ 2017-241154

(51) Int. Cl.
| | |
|---|---|
| *F01N 3/20* | (2006.01) |
| *H05B 3/42* | (2006.01) |
| *H05B 1/02* | (2006.01) |
| *B01J 20/28* | (2006.01) |
| *B01J 37/08* | (2006.01) |
| *F01N 3/28* | (2006.01) |

(52) U.S. Cl.
CPC .......... *H05B 3/42* (2013.01); *B01J 20/28045* (2013.01); *B01J 37/08* (2013.01); *F01N 3/2013* (2013.01); *F01N 3/2828* (2013.01); *H05B 1/0244* (2013.01); *B01J 2219/0815* (2013.01); *B01J 2219/0824* (2013.01); *B01J 2219/32296* (2013.01); *F01N 2240/16* (2013.01); *F01N 2330/06* (2013.01); *F01N 2330/30* (2013.01); *H05B 2203/024* (2013.01)

(58) Field of Classification Search
CPC .. F01N 3/2013; F01N 3/2828; F01N 2240/16; H05B 1/0244; B01J 2219/0824; B01J 2219/0815
USPC ............................ 422/174; 55/523; 219/541
See application file for complete search history.

(56) References Cited

U.S. PATENT DOCUMENTS 5,266,278 A * 11/1993 Harada ................. F01N 3/2026
                                                                      219/541
8,083,043 B2 * 12/2011 Fujita .................... F16D 25/123
                                                                     192/85.29
(Continued)

FOREIGN PATENT DOCUMENTS

| JP | 4136319 B2 | 8/2008 |
| WO | 2013/008664 A1 | 1/2013 |
| WO | 2013/146955 A1 | 10/2013 |

*Primary Examiner* — Tom P Duong
(74) *Attorney, Agent, or Firm* — Burr & Brown, PLLC

(57) ABSTRACT

A conductive honeycomb structure includes: a pillar honeycomb structure portion including an outer peripheral side wall and partition walls, each of the partition walls extending through the pillar honeycomb structure from a first end face to a second end face to define a plurality of cells forming a through channel of a first fluid; a pair of electrode portions disposed in contact with an outer surface of the outer peripheral side wall across a central axis of the honeycomb structure portion; and a pair of terminal connecting portions formed on the outer peripheral side wall, each of the terminal connecting portions being at least partially covered with each of the electrode portions. Each of the electrode portions includes band-shape first, second and third electrode layers each having a predetermined electrical resistance.

12 Claims, 5 Drawing Sheets

Left Side View     Bottom View     Right Side View

(56) References Cited

U.S. PATENT DOCUMENTS

| | | | | |
|---|---|---|---|---|
| 8,530,803 B2* | 9/2013 | Sakashita | ................ | B01J 35/04 |
| | | | | 219/541 |
| 8,597,585 B2* | 12/2013 | Sakashita | ................ | B01J 35/04 |
| | | | | 422/174 |
| 9,228,470 B2* | 1/2016 | Kasai | ................... | F01N 3/2026 |
| 9,585,196 B2* | 2/2017 | Kasai | ................... | F01N 3/2026 |
| 2003/0134084 A1 | 7/2003 | Ichikawa et al. | | |
| 2012/0076698 A1* | 3/2012 | Ishihara | ................ | B01D 53/00 |
| | | | | 422/174 |
| 2012/0076699 A1* | 3/2012 | Ishihara | ............... | B01J 19/2485 |
| | | | | 422/174 |
| 2013/0043236 A1* | 2/2013 | Sakashita | ............. | F01N 3/2828 |
| | | | | 219/553 |
| 2014/0127085 A1 | 5/2014 | Omiya et al. | | |
| 2015/0030510 A1 | 1/2015 | Mase et al. | | |

* cited by examiner

HONEYCOMB STRUCTURE

TECHNICAL FIELD

The present invention relates to a honeycomb structure. More particularly, the present invention relates to a honeycomb structure which can also function as a heater by applying a voltage.

BACKGROUND ART

Conventionally, a catalyst supported on a honeycomb structure made of cordierite or silicon carbide is used for treatment of harmful substances in an exhaust gas discharged from a motor vehicle engine (see, Patent Document 1). Such a honeycomb structure generally includes a pillar shape honeycomb structure portion that has partition walls serving as flow paths for an exhaust gas and defines a plurality of cells extending from one bottom surface to the other bottom surface.

When treating the exhaust gas with the catalyst supported on the honeycomb structure, a temperature of the catalyst should be increased to a predetermined temperature. However, there has conventionally been a issue that since the temperature of the catalyst is low at the start of the engine, the exhaust gas is not sufficiently purified. Therefore, there has been proposed a system called an electrically-heated catalyst (EHC) which increases a temperature of a catalyst supported on a honeycomb structure comprised of conductive ceramics to an activation temperature before or during the start of an engine by providing electrodes to the honeycomb structure and causing the honeycomb structure itself to generate heat by energization. In the EHC, it is desired to allow the catalyst to satisfactorily function by causing the catalyst to uniformly generate heat (with no deviation in a heat generation distribution), without damaging electric systems in a motor vehicle.

In Patent Document 2 proposes a honeycomb structure that is a catalyst carrier, also functions as a heater by applying a voltage, and can suppress a deviation of a temperature distribution when the voltage is applied. Specifically, it proposes that a side surface of the pillar shape honeycomb structure is provided with a pair of electrode portions in a band-like shape extending in a cell extending direction of the honeycomb structure portion, and in a cross section perpendicular to the cell extending direction, one of the electrode portions of the pair of electrode portions is arranged on an opposite side to the other of the electrode portions in the pair of electrode portions sandwiching a center of the honeycomb structure portion, thereby suppressing the deviation in the temperature distribution when the voltage is applied.

Further, Patent Document 3 discloses an approach to scatter portions where heat generation is concentrated in a honeycomb structure, thereby suppressing a local temperature rise of the honeycomb structure and causing the honeycomb structure to generate heat more uniformly. Specifically, Patent Document 3 discloses a honeycomb structure in which each of a pair of electrode portions is formed of a laminate of two or more electrode bodies, and a center angle of the electrode body closest to an outer peripheral wall of the honeycomb structure portion is larger than the central angle of the other electrode bodies.

CITATION LIST

Patent Literatures

Patent Document 1: Japanese Patent No. 4136319 B2
Patent Document 2: WO 2013/146955 A1
Patent Document 3: WO 2013/008664 A1

SUMMARY OF INVENTION

As described above, some approaches have been conducted on a method for uniformly generating heat in the honeycomb structure, but these approaches have not been completely studied yet. Therefore, one of the objects of the present invention is to provide a honeycomb structure showing improved uniform heat generation with a method different from the conventional methods.

According to one embodiment, the present invention relates to a conductive honeycomb structure, comprising:
a pillar shape honeycomb structure portion having:
an outer peripheral side wall; and
partition walls extending through the pillar shape honeycomb structure from a first end face to a second end face to define a plurality of cells forming a through channel;
a pair of electrode portions disposed on an outer surface of the outer peripheral side wall, and one electrode portion in the pair of electrode portions being disposed on a side opposite to the other electrode portion across a central axis of the honeycomb structure portion; and
a pair of terminal connecting portions disposed on the outer peripheral side wall;
wherein each of the pair of electrode portions comprises a first electrode layer, a second electrode layer, and a third electrode layer;
each of the first, second and third electrode layers is shaped in a form of a band extending in a flow path direction of the cells,
each of the first, second and third electrode layers is disposed on the outer surface of the outer peripheral side wall,
the second electrode layer, the first electrode layer, and the third electrode layer are connected in series in a circumferential direction of the outer peripheral side wall in this order,
at least a part of the pair of terminal connecting portions is covered with the first electrode layer;
each of the pair of electrode portions has an electrical resistivity lower than the honeycomb structure portion; and
the conductive honeycomb structure satisfies;

$R_1/R_2 \leq 0.2$ and $R_1/R_3 \leq 0.2$, in the above formulas, in each of the electrode portions,
$R_1$ is an electrical resistance between the terminal connecting portion and a surface point of the first electrode layer farthest from the terminal connecting portion in the flow path direction of the cells;
$R_2$ is an electrical resistance between the terminal connecting portion and a surface point of the second electrode layer farthest from the terminal connecting portion in the circumferential direction of the outer peripheral side wall; and
$R_3$ is an electrical resistance between the terminal connecting portion and a surface point of the third electrode layer farthest from the terminal connecting portion in the circumferential direction of the outer peripheral side wall.

According to another embodiment, the present invention relates to a conductive honeycomb structure, comprising:

a pillar shape honeycomb structure portion having:
an outer peripheral side wall; and
partition walls extending through the pillar shape honeycomb structure from a first end face to a second end face to define a plurality of cells forming a through channel;
a pair of electrode portions disposed on an outer surface of the outer peripheral side wall, and one electrode portion in the pair of electrode portions being disposed on a side opposite to the other electrode portion across a central axis of the honeycomb structure portion; and
a pair of terminal connecting portions disposed on the outer peripheral side wall;
wherein each of the pair of electrode portions comprises:
a band-shape first electrode layer extending from one end, passing through the terminal connecting portion so as to cover at least a part of the terminal connecting portion, to the other end, in a circumferential direction of the outer peripheral side wall, while being in contact with the outer surface of the outer peripheral side wall;
a band-shape second electrode layer connected to one end of the first electrode layer and extending from the one end in a flow path direction of the cells while being in contact with the outer surface of the outer peripheral side wall; and
a band-shape third electrode layer connected to the other end of the first electrode layer and extending from the other end in the flow path direction of the cells while being in contact with the outer surface of the outer peripheral sidewall;
each of the pair of electrode portions has an electrical resistivity lower than the honeycomb structure portion;
at least a part of the pair of terminal connecting portions is covered with the first band-shape electrode layer; and
wherein the conductive honeycomb structure satisfies;

$R_2/R_{12} \leq 0.2$ and $R_3/R_{13} \leq 0.2$, in the above formulas,
in each of the electrode portions, $R_{12}$ is an electrical resistance between the terminal connecting portion and a surface point $A_1$ of the first band-shape electrode layer farthest in the circumferential direction of the outer peripheral side wall from the terminal connecting portion toward the second band-shape electrode layer;
$R_2$ is an electrical resistance between a surface point $A_2$ of the band-shape second electrode layer closest to the terminal connecting portion in the circumferential direction of the outer circumference side wall and a surface point $A_3$ of the band-shape second electrode layer farthest from the surface point $A_2$ in the flow path direction of the cells;
$R_{13}$ is an electrical resistance between the terminal connecting portion and a surface point $B_1$ of the first band-shape electrode layer farthest in the circumferential direction of the outer peripheral side wall from the terminal connecting portion toward the third band-shape electrode layer; and
$R_3$ is an electrical resistance between a surface point $B_2$ of the third band-shape electrode layer closest to the terminal connecting portion in the circumferential direction of the outer circumference side wall and a surface point $B_3$ of the third band-shape electrode layer farthest from the surface point $B_2$ in the flow path direction of the cells.

According to the present invention, uniformity of heat generation of the honeycomb structure can be improved, so that the catalyst can function satisfactorily. For example, the use of the honeycomb structure according to the present invention as the EHC can improve environmental performance of a motor vehicle.

DESCRIPTION OF THE PREFERRED EMBODIMENTS

Embodiments for carrying out the present invention will now be described in detail with reference to the drawings. It should be understood that the present invention is not intended to be limited to the following embodiments, and any change, improvement or the like of the design may be appropriately added on the basis of ordinary knowledge of those skilled in the art without departing from the spirit of the present invention.

As used herein, the expression "circumferential direction" means a circumferential direction of an outer peripheral side wall in a cross section orthogonal to a flow path direction of cells of a honeycomb structure.

As used herein, the expression "flow path direction of cells" is synonymous with an "axial direction", and both are used interchangeably.

In the present invention, an electrical resistance and an electrical resistivity are values measured at 400° C. by a four-probe method, unless otherwise specified.

1. First Embodiment of Conductive Honeycomb Structure

<1-1 Overall Structure>

Figure 1:
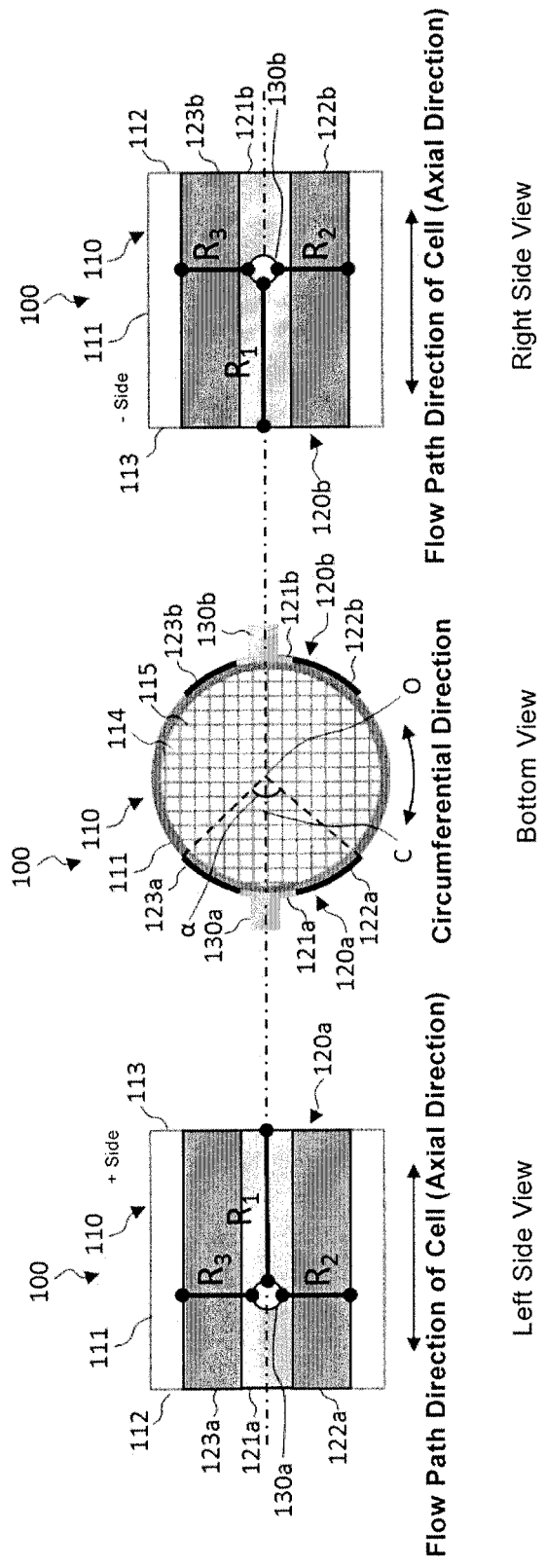
FIG. 1 shows schematic views (a bottom view, left side view and right side view) of a first embodiment of a honeycomb structure according to the present invention.

FIG. 1 shows schematic views (a bottom view, a left side view and a right side view) of a first embodiment of a conductive honeycomb structure according to the present invention. A honeycomb structure 100 according to the present embodiment has a pillar shape honeycomb structure portion 110 which includes: an outer peripheral side wall 111; and partition walls 115 extending through the pillar shape honeycomb structure from a first end face 112 to a second end face 113 to define a plurality of cells 114 forming a through channel. The partition walls 115 may be porous. Fluid can flow through the flow paths of the plurality of cells 114.

The honeycomb structure 100 according to the present embodiment includes a pair of electrode portions 120a, 120b provided so as to be on an outer surface of the outer peripheral side wall 111, and one electrode portion in the pair of electrode portions 120a, 120b being disposed on a side opposite to the other electrode portion across a central axis O of the honeycomb structure portion 110. The honeycomb structure 100 according to the present embodiment also includes a pair of terminal connecting portions 130a, 130b disposed on the outer peripheral side wall 111, each of the pair of terminal connecting portions 130a, 130b being at least partially covered with each of the pair of electrode portions 120a, 120b.

(1-2 Honeycomb Structure Portion)

The material for forming the honeycomb structure portion 100 is not particularly limited as long as it has conductivity, and metal, ceramics or the like may be used. In particular, it is preferable that the material of the honeycomb structure portion 100 be mainly based on a silicon-silicon carbide composite material or a silicon carbide, and more preferably it may be the silicon-silicon carbide composite material or silicon carbide, in terms of compatibility of heat resistance and electrical conductivity. To decrease the electrical resistivity of the honeycomb structure portion, tantalum silicide ($TaSi_2$) or chromium silicide ($CrSi_2$) may also be blended. The phrase "the honeycomb structure portion 100 is mainly based on a silicon-silicon carbide composite material" as used herein means that the honeycomb structure portion 100 contains the silicon-silicon carbide (total mass) in an amount of 90% by mass or more of the entire honeycomb structure portion. Here, the silicon-silicon carbide composite material contains silicon carbide particles as an aggregate and silicon as a binder for bonding the silicon carbide particles to each other, and it is preferable that the silicon carbide particles be bonded by silicon such that pores are formed between the silicon carbide particles. The phrase "the honeycomb structure portion 100 is mainly based on silicon carbide" as used herein means that the honeycomb structure portion 100 contains silicon carbide (total mass) in an amount of 90% by mass or more of the entire honeycomb structure portion.

The honeycomb structure portion 110 of the honeycomb structure 100 according to the present embodiment can generate Joule heat through energization when a voltage is applied between the pair of electrode portions 120a, 120b via the pair of terminal connecting portions 130a, 130b. Therefore, the honeycomb structure portion 110 can be suitably used as a heater. The applied voltage is preferably from 12 to 900 V, and more preferably from 64 to 600 V, although the applied voltage may be varied as needed. Further, a catalyst is supported on the honeycomb structure portion 110, so that the honeycomb structure 100 can be used as a catalyst body.

The electrical resistivity of the honeycomb structure portion 110 may be set as appropriate depending on the voltage to be applied, and non-limiting example of the electrical resistivity may be, for example, from 0.001 to 200 Ω·cm. For a high voltage of 64 V or more, the electrical resistivity may be from 2 to 200 Ω·cm, and typically from 5 to 100 Ω·cm. Further, for a low voltage of less than 64 V, the electrical resistivity may be from 0.001 to 2 Ω·cm, and typically from 0.001 to 1 Ω·cm, and more typically from 0.01 to 1 μcm.

The partition walls 110 of the honeycomb structure portion 110 may preferably have a porosity of from 35 to 60%, and more preferably from 35 to 45%. If the porosity is less than 35%, increased deformation may occur during firing. If the porosity exceeds 60%, the strength of the honeycomb structure may be decreased. The porosity is a value measured by a mercury porosimeter.

The partition walls 110 of the honeycomb structure may preferably have an average pore diameter of from 2 to 15 μm, and more preferably 4 to 8 μm. If the average pore diameter is smaller than 2 μm, the electrical resistivity may become too high. If the average pore diameter is larger than 15 μm, the electrical resistivity may become too small. The average pore diameter is a value measured by a mercury porosimeter.

The shape of each cell 114 in the cross section orthogonal to the flow path direction of the cells 114 includes, but not limited to, preferably a quadrangle, a hexagon, an octagon, or a combination thereof. Among them, square and hexagon shapes may be preferable. Such a cell shape will reduce the pressure loss when the exhaust gas flows through the honeycomb structure 100, thereby resulting in improved purification performance of the catalyst.

The external shape of the honeycomb structure portion 110 is not particularly limited as long as it is a pillar shape. For example, the external shape of the honeycomb structure portion 110 may be a pillar shape with circular bottoms (cylindrical shape), a pillar shape with oval bottoms, a pillar shape with polygonal bottoms (quadrangle, pentagon, hexagon, heptagon and octagon shapes, etc.), or the like. For the size of the honeycomb structure portion 110, the area of the bottom surface 112,113 may be preferably from 2000 to 20000 $mm^2$, and more preferably from 4000 to 10000 $mm^2$, in terms of improving the heat resistance (preventing cracks generated in the outer peripheral wall in the circumferential direction). Further, the length of the honeycomb structure portion 110 in the axial direction may be preferably from 50 to 200 mm, and more preferably from 75 to 150 mm, in terms of improving the heat resistance (preventing cracks generated parallel to the central axis direction in the outer peripheral side wall).

(1-3 Electrode Portion and Terminal Connecting Portion)

The honeycomb structure 100 according to the present embodiment includes a pair of electrode portions 120a, 120b provided so as to be on the outer surface of the outer peripheral side wall 111 across a central axis O of the honeycomb structure portion 110. The honeycomb structure 100 according to the present embodiment also includes a pair of terminal connecting portions 130a, 130b disposed on the outer peripheral side wall 111, each of the pair of terminal connecting portions 130a, 130b being at least partially covered with each of the pair of electrode portions 120a, 120b. With such arrangements, the honeycomb structure 100 can suppress a deviation in an electric current flowing through the honeycomb structure portion 110 when a voltage is applied between the pair of electrode portions 120a, 120b via the terminal connecting portions 130a, 130b, so that it is possible to suppress a deviation of a temperature distribution in the honeycomb structure portion 110.

One electrode portion 120a includes a first electrode layer 121a, second electrode layer 122a and third electrode layer 123a in the form of band, each extending in the flow path direction of the cells 114 while being on the outer surface of the outer peripheral side wall 111. The second electrode layer 122a, the first electrode layer 121a, and the third electrode layer 123a are connected in series in the circumferential direction of the outer peripheral side wall 111 in this order.

Likewise, the other electrode portion 120b also include a first electrode layer 121b, second electrode layer 122b and a third electrode layer 123b in the form of band, each extending in the flow path direction of the cells 114 while being on the outer surface of the outer peripheral side wall 111. The second electrode layer 122b, the first electrode layer 121b, and the third electrode layer 123b are connected in series in the circumferential direction of the outer peripheral side wall 111 in this order.

One side end of each of the second electrode layer 122a, 122 b and the third electrode layer 123a, 123b in the circumferential direction is adjacent to each side end of the first electrode layer 121a, 121b in the circumferential direction. In other words, one circumferential side end of the first electrode layer 121a, 121b is connected to one circumferential end of the second electrode layer 122a, 122b without any gap, and the other circumferential side end of the first electrode layer 121a, 121b is connected to one circumferential end of the third electrode layer 123a, 123b without any gap. Thus, an electric current from the terminal connecting portion 130a, 130b can easily flow into the second electrode layer 122a, 122b and the third electrode layer 123a, 123b through the first electrode layer 121a, 121b, so that it is possible to facilitate spread of an electric current flowing in the circumferential direction.

Figure 2:
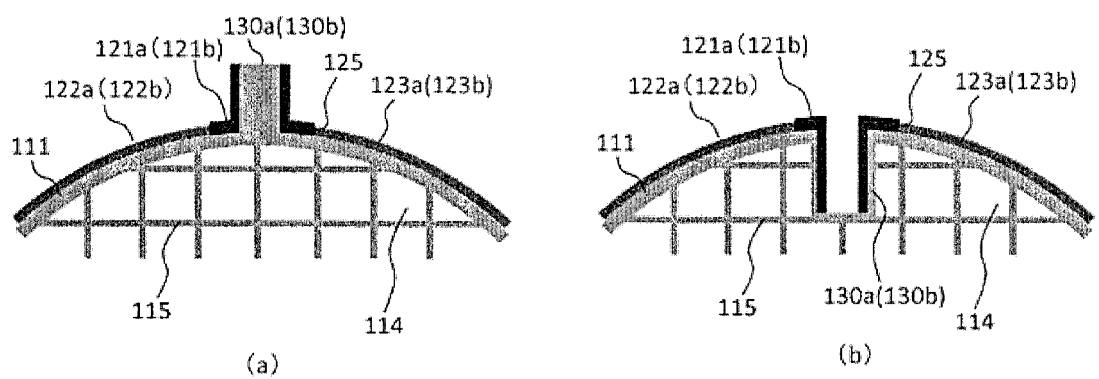
FIG. 2 is a schematic partial cross-sectional view of a honeycomb structure according to a first embodiment, which shows an example of a positional relationship among a first electrode layer, a second electrode layer and a third electrode layer formed in contact with an outer surface of an outer peripheral side wall of a honeycomb structure portion, and a terminal connecting portion.

Further, when the first electrode layer 121a, 121b and the second electrode layer 122a, 122b are connected to each other with one side end portion mounting on the other side end portion, a gap tends to be generated between the outer surface of the outer peripheral side wall 111 and the electrode layer, causing deterioration of adhesion of the electrode layer. Therefore, as shown in FIG. 2, it is preferable that the circumferential side ends of the first electrode layer 121a, 121b and the second electrode layer 122a, 122b be at least on each other at a side surface 125 located between the outer surface and the inner surface. This also applies to the connection between the circumferential side ends of the first electrode layer 121a, 121b and the third electrode layer 123a, 123b.

By decreasing the electrical resistivity of the electrode portions 120a, 120b to be lower than the electrical resistivity of the honeycomb structure portion 110, the electricity tends to flow preferentially into the electrode portions, and the electricity tends to spread in the axial direction and circumferential direction during energization. The electrical resistivity of the electrode portions 120a, 120b may be preferably 1/10 or less, more preferably 1/20 or less, and even more preferably 1/30 or less than that of the honeycomb structure portion 110. However, if a difference in electrical resistivity between them is too large, the electricity will spread too much in the circumferential direction and the temperature near the central axis O of the honeycomb structure portion 110 will be difficult to increase. Therefore, the electrical resistivity of the electrode portions 120a, 120b may be preferably 1/1000 or more, more preferably 1/500 or more, and still more preferably 1/300 or more of the electrical resistivity of the honeycomb structure portion 110.

The electrical resistivity of the electrode portion 120a, 120b may be set as appropriate depending on the voltage to be applied, and it may be, but not particularly limited to, for example, from 0.0001 to 100 Ω·cm. For a high voltage of 64 V or more, the electrical resistivity may be from 0.1 to 100 Ω·cm, and typically from 0.5 to 50 Ω·cm. Further, for a low voltage of less than 64 V, it may be from 0.0001 to 0.1 Ω cm, and typically from 0.0005 to 0.05 Ω·cm.

A metal, ceramics or the like can be used for the electrode portion 120a, 120b. Representative metals include, but not limited to, silver, copper, nickel, gold, palladium, silicon, and the like, in terms of easy availability. Carbon may also be used. Ceramics include, but not limited to, ceramics containing at least one of Si, Cr, B, Fe, Co, Ni, Ti and Ta, and illustratively, silicon carbide, chromium silicide, boron carbide, chromium boride, and tantalum silicide. A composite material formed by combining the metal(s) and ceramics may be used.

Even if the material of the electrode portion 120a, 120b is mainly based on the silicon-silicon carbide composite material or silicon carbide as with the honeycomb structure portion 110, the electrical resistivity of the electrode portion 120a, 120b can be decreased to be lower than that of the honeycomb structure portion 110 by changing other components in the electrode portions 120a, 120b, or increasing a mixing ratio of silicon to be higher than that of the honeycomb structure portion 110, or decreasing the porosity, or decreasing particle diameters of the metallic silicon particles as a raw material.

In terms of improving uniformity of heat generation of the honeycomb structure portion 110, it is preferable that the electric current spread in the axial direction and the circumferential direction when terminals are connected to the pair of terminal connecting portions 130a, 130b and a voltage is applied. Referring to FIG. 1, in the present embodiment, $R_1/R_2 \leq 0.2$ and $R_1/R_3 \leq 0.2$ are satisfied, in the above formulas, in each of the pair of electrode portions 120a, 120b, $R_1$ is an electrical resistance between the terminal connecting portion 130a, 130b and a surface point of the first electrode layer 121a, 121b farthest from the terminal connecting portion 130a, 130b in the flow path direction of the cells; $R_2$ is an electrical resistance between the terminal connecting portion 130a, 130b and a surface point of the second electrode layer 122a, 122b farthest from the terminal connecting portion 130a, 130b in the circumferential direction of the outer peripheral side wall 111; and $R_3$ is an electrical resistance between the terminal connecting portion 130a, 130b and a surface point of the third electrode layer 123a, 123b farthest from the terminal connecting portion 130a, 130b in the circumferential direction of the outer peripheral side wall 111. $R_1/R_2 \leq 0.1$ and $R_1/R_3 \leq 0.1$ are preferably satisfied, $R_1/R_2 \leq 0.05$ and $R_1/R_3 \leq 0.05$ are more preferably satisfied, $R_1/R_2 \leq 0.01$ and $R_1/R_3 \leq 0.01$ are even more preferably satisfied, for example, $0.001 \leq R_1/R_2 \leq 0.2$ and $0.001 \leq R_1/R_3 \leq 0.2$ are satisfied. It is noted that a position of an electrode (a needle) to be brought into contact with the terminal connecting portion when measuring $R_1$, $R_2$ and $R_3$ is a position where a value of each of $R_1$, $R_2$ and $R_3$ is the smallest, respectively.

As an example, we now discuss a case where a positive voltage is applied to the terminal connecting portion 130a on the left side and a negative voltage is applied to the terminal connecting portion 130b on the right side. When the above relationship is established for $R_1/R_2$ and $R_1/R_3$, the electric current flowing in from the terminal connecting portion 130a will tend to spread over the entire axial direction through the first electrode layer 121a on the left side, because the first electrode layer 121a has a lower electrical resistance. That is, the present embodiment can increase a ratio of the electric current flowing in the circumferential direction toward the second electrode layer 122a and the third electrode layer 123a after flowing to both axial ends of the first electrode layer 121a. The electric current flowing to the circumferential side end of each of the second electrode layer 122a and the third electrode layer 123a can then reach the second electrode layer 122b and the third electrode layer 123b on the right side through the inside of the honeycomb structure portion 110, and then flow out from the terminal connecting portion 130b through the first electrode layer 121b on the right side.

Figure 3:
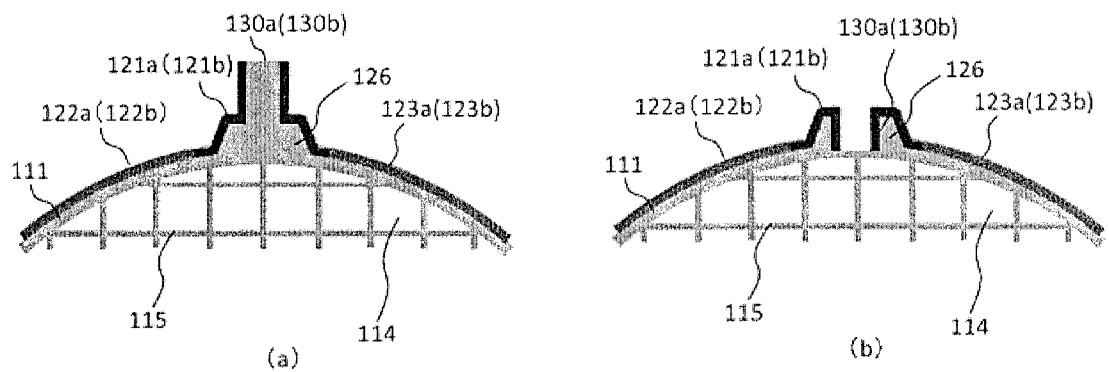
FIG. 3 is a schematic partial cross-sectional view of a honeycomb structure according to a first embodiment, which shows an example of a positional relationship among a first electrode layer, a second electrode layer and a third electrode layer, and a terminal connecting portion, for a case where an outer peripheral side wall of a honeycomb structure portion has protruding portions.

Referring to FIG. 3, the outer peripheral side wall 111 may have a pair of protruding portions 126 extending in the flow path direction of the cells 114, and one protruding portion in the pair of protruding portions 126 is disposed on a side opposite to the other protruding portion across the central axis of the honeycomb structure portion 110. Each of the pair of terminal connecting portions 130a (130b) may be disposed at a portion where the protruding portion 126 is formed. In other words, the first electrode layer 121a (121b) can be formed on the protruding portion 126. Since the portions of the outer peripheral side wall 111 having the pair of protruding portions 126 will have a relatively large thickness, the electrical resistance in the axial direction is lowered, so that the electric current flowing into the terminal connecting portion 130a (130b) will easily spread in the axial direction. This can help to improve the uniformity of heat generation.

In terms of improvement of the uniformity of heat generation, it is preferable that the electric current flowing into the first electrode layer through the terminal connecting portion uniformly flow through the second electrode layer and the third electrode layer. Therefore, it is desirable that a difference between $R_2$ and $R_3$ is as small as possible. Specifically, $0.8 \leq R_2/R_3 \leq 1.2$ is preferable, and $0.9 \leq R_2/R_3 \leq 1.1$ is more preferable, and $R_2=R_3$ is still more preferable.

It is desirable that the first electrode layer 121a, 121b extend over a length of 80% or more, and preferably 90% or more, and more preferably the entire length between both bottom surfaces of the honeycomb structure portion 110, from the viewpoint that the electric current easily spreads in the axial direction of the first electrode layer 121a, 121b. Likewise, it is desirable that the second electrode layer 122a, 122b and the third electrode layer 123a, 123b extend over a length of 80% or more, and preferably a length of 90% or more, and more preferably the entire length between both bottom surfaces of the honeycomb structure portion 110, from the viewpoint of improving the uniformity of heat generation of the honeycomb structure portion 110.

A method for satisfying the above relationship for $R_1/R_2$ and $R_1/R_3$ includes, for example, a method for decreasing the electrical resistivity of the first electrode layer 121a, 121b so that it is lower than that of the second electrode layer 122a, 122b and the electrical resistivity of the third electrode layer 123a, 123b. In this case, $\rho_1/\rho_2 \leq 0.5$ and $\rho_1/\rho_3 \leq 0.5$ are preferably satisfied, $\rho_1/\rho_2 \leq 0.1$ and $\rho_1/\rho_3 \leq 0.1$ are more preferably satisfied, and $\rho_1/\rho_2 \leq 0.01$ and $\rho_1/\rho_3 \leq 0.01$ are even more preferably satisfied, and $\rho_1/\rho_2 \leq 0.005$ and $\rho_1/\rho_3 \leq 0.005$ are still more preferably satisfied, for example, $0.0001 \leq \rho_1/\rho_2 \leq 0.5$ and $0.0001 \leq \rho_1/\rho_3 \leq 0.5$ may be satisfied, in which $\rho_1$ is an electrical resistivity of the first electrode layer; $\rho_2$ is an electrical resistivity of the second electrode layer; and $\rho_3$ is an electrical resistivity of the third electrode layer.

Another method for satisfying the above relationship for $R_1/R_2$ and $R_1/R_3$ includes a method for changing the thicknesses of the first electrode layer, the second electrode layer and the third electrode layer. By increasing the thickness of the first electrode layer so that it is larger than that of the second electrode layer and the third electrode layer, the electrical resistance of the first electrode layer is lowered and the electric current will preferentially flow through the first electrode layer. However, since it is difficult to extremely increase the thickness difference, it has less degree of freedom than the electrical resistivity. By way of example, the relationships: $1.2 \leq T_1/T_2 \leq 5$ and $1.2 \leq T_1/T_3 \leq 5$ can be satisfied, in which $T_1$ is a thickness of the first electrode layer; $T_2$ is a thickness of the second electrode layer; and $T_3$ is a thickness of the third electrode layer. Since there is no need for adjusting the thickness if the electrical resistivity is adjusted, the thickness of the first electrode layer may be thinner than or equal to that of the second electrode layer and the third electrode layer.

Each of $T_1$, $T_2$, and $T_3$ may be preferably from 0.01 to 5 mm, and more preferably from 0.01 to 3 mm. Such a range can lead to improvement of the uniformity of heat generation. If $T_1$, $T_2$, and $T_3$ are smaller than 0.01 mm, the electrical resistance may become higher, which may not uniformly generate heat. If $T_1$, $T_2$, and $T_3$ are thicker than 5 mm, breakage may occur during canning.

A method for decreasing the difference between $R_2$ and $R_3$ includes a method for decreasing a difference between $\rho_2$ and $\rho_3$. Specifically, $0.8 \leq \rho_2/\rho_3 \leq 1.2$ is preferable, $0.9 \leq \rho_2/\rho_3 \leq 1.1$ is more preferable, and $\rho_2=\rho_3$ is still more preferable. If $\rho_2$ and $\rho_3$ are the same, the second electrode layer and the third electrode layer can be formed of the same material, so that costs for preparing the electrode forming materials can be reduced.

In view of improving the uniformity of heat generation, the honeycomb structure 100 is formed such that each of the pair of electrode portions 120a, 120b is arranged in line symmetry with a straight line C connecting the respective circumferential centers of the pair of the electrode portions 120a, 120b as an axis of symmetry, when the honeycomb structure 100 is observed in any cross section orthogonal to the flow path direction of the cells 114 (see FIG. 1).

Referring now to FIG. 1, in the cross section orthogonal to the flow direction of the cells, a central angle α formed by the two line segments connecting each of the side ends of electrode layer 120a, 120b in the circumferential direction to the central axis O may be preferably 30° or more, and more preferably 40° or more, and still more preferably 60° or more, in terms of spreading the electric current in the circumferential direction to enhance the uniformity of heat generation. However, if the central angle α is too large, the electric current passing through the inside of the honeycomb structure portion 110 will be decreased, and the electric current passing near the outer peripheral side wall 111 will be increased. Therefore, the central angle α may be preferably 140° or less, and more preferably 130° or less, and still more preferably 120° or less, in terms of the uniformity of heat generation of the honeycomb structure portion 110.

In terms of improving the uniformity of heat generation, at least a part of the terminal connecting portion 130a, 130b is preferably disposed so as to be covered with the first electrode layer 121a, 121b, and at least a part of the terminal connecting portion 130a, 130b is more preferably disposed so as to be covered with the first electrode layer 121a, 121b at the central portion of the first electrode layer 121a, 121b in the circumferential direction.

The shape of the terminal connecting portion 130a (130b) is not particularly limited, and it may be, for example, provided so as to be convex on the outer peripheral side wall 111 of the honeycomb structured portion, as shown in FIGS. 2(a) and 3(a). At least a part of the convex terminal connecting portion 130a (130b) can be covered with the first electrode layer 121a (121b). In this case, for example, the terminal connecting portion and the terminal can be connected by clipping the terminal connecting portion covered with the first electrode layer with a clip type terminal, or by inserting a concave type terminal into the terminal connecting portion covered with the first electrode layer.

Further, as shown in FIGS. 2(b) and 3(b), the concave terminal connecting portion 130a (130b) can be disposed on the outer peripheral side wall 111 of the honeycomb structure portion. At least a part of the concave terminal connecting portion 130a (130b) can be covered with the first electrode layer 121a (121b). In this case, the terminal connecting portion and the terminal can be connected by inserting a convex terminal into the terminal connecting portion, for example.

It is preferable that the terminal connecting portion 130a (130b) have corrosion resistance because it is exposed to an exhaust gas atmosphere. Therefore, for example, the terminal connecting portion 130a (130b) can be made of an alloy containing at least one selected from the group consisting of Si, Cr, Fe, Co, Ni and Ti or ceramics containing SiC.

When the honeycomb structure portion is mainly based on a silicon-silicon carbide composite material or silicon carbide, it is preferable that the terminal connecting portion be also mainly based on the silicon-silicon carbide composite material or silicon carbide. When the terminal connecting portion is mainly based on the silicon-silicon carbide composite material or silicon carbide, the components of the honeycomb structure portion and those of the terminal connecting portion will be the same (or close to each other). Therefore, a thermal expansion coefficient of the terminal connecting portion will be the same (close) value as that of the honeycomb structure portion. Further, since the material of the honeycomb structure portion and that of the terminal connecting portion are the same (or close to each other), a bonding strength of the honeycomb structure portion to the terminal connecting portion is also increased. Therefore, even if thermal stress is applied to the honeycomb structure portion, it is possible to prevent the terminal connecting portion from peeling off from the honeycomb structure portion, or to prevent the joint portion between the terminal connecting portion and the honeycomb structure portion from being damaged. As used herein, the phrase "mainly based on a silicon-silicon carbide composite material" means that the terminal connecting portion contains the silicon-silicon carbide composite material (total mass) in an amount of 90% by mass or more of the entire terminal connecting portion. Further, as used herein, the phrase "the terminal connecting portion is mainly based on silicon carbide" means that the terminal connecting portion contains silicon carbide (total mass) in an amount of 90% by mass or more of the entire terminal connecting portion.

2. Second Embodiment of Conductive Honeycomb Structure

<2-1 Overall Structure>

Figure 4:
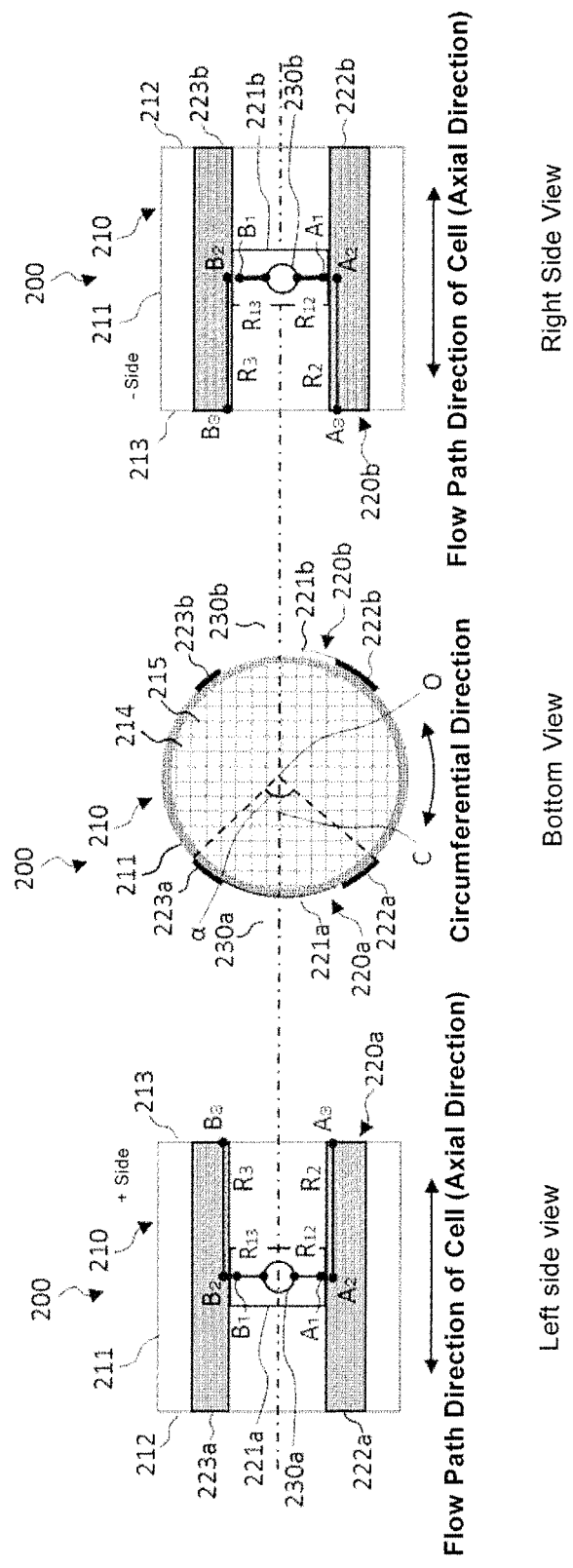
FIG. 4 shows schematic views (a bottom view, a left side view and a right side view) of a second embodiment of a honeycomb structure according to the present invention.

FIG. 4 shows schematic views (a bottom view, a left side view and a right side view) of a second embodiment of a conductive honeycomb structure according to the present invention. A honeycomb structure 200 according to the present embodiment has a pillar shape honeycomb structure portion 210 which includes: an outer peripheral side wall 211; and partition walls 215 disposed inside the outer peripheral side wall and defining a plurality of cells 214 that penetrate from a first end face 212 to a second end face 213 to form flow paths. The partition walls 215 may be porous. Fluid can flow through the flow paths of the plurality of cells 214.

The honeycomb structure 200 according to the present embodiment includes a pair of electrode portions 220a, 220b provided so as to be on an outer surface of the outer peripheral side wall 211 across a central axis O of the honeycomb structure portion 210. The honeycomb structure 200 according to the present embodiment also includes a pair of terminal connecting portions 230a, 230b disposed on the outer peripheral side wall 211, each of the pair of terminal connecting portions 230a, 230b being at least partially covered with each of the pair of electrode portions 220a, 220b.

(2-2 Honeycomb Structure Portion)

The honeycomb structure portion 210 of the honeycomb structure 200 according to the present embodiment is the same as the honeycomb structure portion 110 according to the first embodiment, and descriptions of the honeycomb structure portion 210 will be thus omitted. For elements of the honeycomb structure portion 210 according to the second embodiment and those of the honeycomb structure portion 110 according to the first embodiment, those having the same last two digits of a reference numeral correspond to each other.

(2-3 Electrode Portion and Terminal Connecting Portion)

The honeycomb structure 200 according to the present embodiment includes a pair of electrode portions 220a, 220b provided so as to be on the outer surface of the outer peripheral side wall 211, and one electrode portion in the pair of electrode portions 220a, 220b being disposed on a side opposite to the other electrode portion across the central axis O of the honeycomb structure portion 210. The honeycomb structure 200 according to the present embodiment includes a pair of terminal connecting portions 230a, 230b disposed on the outer peripheral side wall 211, each of the pair of terminal connecting portions 230a, 230b being at least partially covered with each of the pair of electrode portions 220a, 220b. With such arrangements, the honeycomb structure 200 can suppress a deviation in an electric current flowing through the honeycomb structure portion 210 when a voltage is applied between the pair of electrode portions 220a, 220b via the terminal connecting portions 230a, 230b, so that it is possible to suppress a deviation of a temperature distribution in the honeycomb structure portion 210.

One electrode portion 220a includes a band-like first electrode layer 221a extending from one end, passing through the terminal connecting portion 230a so as to cover at least a part of the terminal connecting portion, to the other end, in the circumferential direction of the outer peripheral side wall 211, while being on the outer surface of the outer peripheral side wall 211; a band-shape second electrode layer 222a connected to the one end of the first electrode layer 221a and extending from the one end in the flow path direction of the cells 214 while being on the outer surface of the outer peripheral side wall 211; and a band-shape third electrode layer 223a connected to the other end of the first electrode layer 221a and extending from the other end in the flow path direction of the cells 214 while being on the outer surface of the outer peripheral side wall 211.

Likewise, the other electrode portion 220b includes a band-shape first electrode layer 221b extending from one end, passing through the terminal connecting portion 230b so as to cover at least a part of the terminal connecting portion, to the other end, in the circumferential direction of the outer peripheral side wall 211, while being on the outer surface of the outer peripheral side wall 211; a band-shape second electrode layer 222b connected to the one end of the first electrode layer 221b and extending from the one end in the flow path direction of the cells 214 while being on the outer surface of the outer peripheral side wall 211; and a band-shape third electrode layer 223b connected to the other end of the first electrode layer 221b and extending from the other end in the flow path direction of the cells 214 while being on the outer surface of the outer peripheral sidewall 211.

One side end of each of the second electrode layer 222a, 222b and the third electrode layer 223a, 223b in the circumferential direction is adjacent to each side end of the first electrode layer 221a, 221b in the circumferential direction. In other words, one circumferential side end of each of the first electrode layer 221a, 221b is connected to one circumferential end of the second electrode layer 222a, 222b without any gap, and the other circumferential side end of the first electrode layer 221a, 221b is connected to one circumferential end of the third electrode layer 223a, 223b without any gap. Thus, an electric current from the terminal connecting portion 230a, 230b can easily flow into the second electrode layer 222a, 222b and the third electrode layer 223a, 223b through the first electrode layer 221a, 221b, so that it is possible to facilitate spread of an electric current flowing in the circumferential direction.

Figure 5:
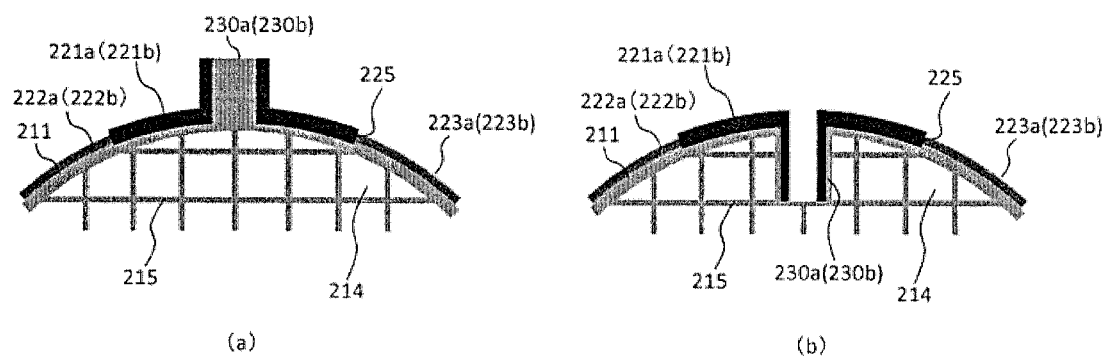
FIG. 5 is a schematic partial cross-sectional view of a honeycomb structure according to a second embodiment, which shows an example of a positional relationship among a first electrode layer, a second electrode layer and a third electrode layer formed in contact with an outer surface of an outer peripheral side wall of a honeycomb structure portion, and a terminal connecting portion.

Further, when the first electrode layer 221a, 221b and the second electrode layer 222a, 222b are connected to each other with one side end portion mounting on the other side end portion, a gap tends to be generated between the outer surface of the outer peripheral side wall 211 and the electrode layer, causing deterioration of adhesion of the electrode layer. Therefore, as shown in FIG. 5, it is preferable that the circumferential side ends of the first electrode layer 221a, 221b and the second electrode layer 222a, 222b be at least in contact with each other at a side surface 225 located between the outer surface and the inner surface. This also applies to the connection between the circumferential side ends of the first electrode layer 221a, 221b and the third electrode layer 223a, 223b.

By decreasing the electrical resistivity of each of the pair of electrode portions 220a, 220b to be lower than the electrical resistivity of the honeycomb structure portion 210, the electricity tends to flow preferentially into the electrode portions, and the electricity tends to spread in the axial direction and circumferential direction during energization. The electrical resistivity of the electrode portion 220a, 220b may be preferably 1/10 or less, more preferably 1/20 or less, and even more preferably 1/30 or less than that of the honeycomb structure portion 210. However, if a difference in electrical resistivity between them is too large, the electricity will spread too much in the circumferential direction and the temperature near the central axis O of the honeycomb structure portion 210 will be difficult to increase. Therefore, the electrical resistivity of the electrode portion 220a, 220b may be preferably 1/1000 or more, more preferably 1/500 or more, and still more preferably 1/300 or more than the electrical resistivity of the honeycomb structure portion 210.

The electrical resistivity of the electrode portion 220a, 220b may be set as appropriate depending on the voltage to be applied, and it may be, but not particularly limited to, for example, from 0.0001 to 100 Ω·cm. For a high voltage of 64 V or more, the electrical resistivity may be from 0.1 to 100 Ω·cm, and typically from 0.5 to 50 Ω·cm. Further, for a low voltage of less than 64 V, it may be from 0.0001 to 0.1 Ω·cm, and typically from 0.0005 to 0.05 Ω·cm.

A metal, ceramics or the like can be used for the electrode portion 220a, 220b. Representative metals include, but not limited to, silver, copper, nickel, gold, palladium, silicon, and the like, in terms of easy availability. Carbon may be used. Ceramics include, but not limited to, ceramics containing at least one of Si, Cr, B, Fe, Co, Ni, Ti and Ta, and illustratively, silicon carbide, chromium silicide, boron carbide, chromium boride, and tantalum silicide. A composite material formed by combining the metal(s) and ceramics may be used.

Even if the material of the electrode portion 220a, 220b is mainly based on the silicon-silicon carbide composite material or silicon carbide as with the honeycomb structure portion 210, the electrical resistivity of the electrode portion 220a, 220b can be decreased to be lower than that of the honeycomb structure portion 210 by changing other components in the electrode portion 220a, 220b, or increasing a mixing ratio of silicon to be higher than that of the honeycomb structure portion 210, or decreasing the porosity, or decreasing particle diameters of the metallic silicon particles as a raw material.

In terms of improving uniform heat generation of the honeycomb structure portion 210, it is preferable that the electric current spread in the axial direction and the circumferential direction when terminals are connected to the pair of terminal connecting portions 230a, 230b and a voltage is applied. Referring to FIG. 4, in the present embodiment, $R_2/R_{12} \leq 0.2$ and $R_3/R_{13} \leq 0.2$ are satisfied, in the above formulas, in each of the pair of electrode portions 220a, 220b, $R_{12}$ is an electrical resistance between the terminal connecting portion 230a, 230b and a surface point $A_1$ of the first electrode layer 221a, 221b farthest in the circumferential direction of the outer peripheral side wall 211 from the terminal connecting portion 230a, 230b toward the second electrode layer 222a, 222b; $R_2$ is an electrical resistance between a surface point $A_2$ of the second electrode layer 222a, 222b closest to the terminal connecting portion 230a, 230b in the circumferential direction of the outer peripheral side wall 211 and a surface point $A_3$ of the second electrode layer 222a, 222b farthest from the surface point $A_2$ in the flow path direction of the cells 214; $R_{13}$ is an electrical resistance between the terminal connecting portion 230a, 230b and a surface point $B_1$ of the first electrode layer 221a, 221b farthest in the circumferential direction of the outer peripheral side wall 211 from the terminal connecting portion 230a, 230b toward the third electrode layer 223a, 223b; and $R_3$ is an electrical resistance between a surface point $B_2$ of the third electrode layer 223a, 223b closest to the terminal connecting portion 230a, 230b in the circumferential direction of the outer peripheral side wall 211 and a surface point $B_3$ of the third electrode surface 223a, 223b farthest from the surface point $B_2$ in the flow path direction of the cells 214. $R_2/R_{12} \leq 0.1$ and $R_3/R_{13} \leq 0.1$ are preferably satisfied, $R_2/R_{12} \leq 0.05$ and $R_3/R_{13} \leq 0.05$ are more preferably satisfied, $R_2/R_{12} \leq 0.01$ and $R_3/R_{13} \leq 0.01$ are even more preferably satisfied, for example, $0.001 \leq R_2/R_{12} \leq 0.2$ and $0.001 \leq R_3/R_{13} \leq 0.2$ are satisfied. It is noted that a position of an electrode (a needle) to be brought into contact with the terminal connecting portion when measuring $R_{12}$, $R_2$, $R_{13}$ and $R_3$ is a position where a value of each of $R_{12}$, $R_2$, $R_{13}$ and $R_3$ is the smallest, respectively.

As an example, we now discuss a case where a positive voltage is applied to the terminal connecting portion 230a on the left side and a negative voltage is applied to the terminal connecting portion 230b on the right side. When the above relationship is established for $R_2/R_{12}$ and $R_3/R_{13}$, the electric current flowing in from the terminal connecting portion 230a will tend to flow in the circumferential direction through the first electrode layer 221a on the left side. After flowing to both side ends of the first electrode layer 221a in the circumferential direction, the electric current can flow to the opposing first electrode layer 221b through the inside of the honeycomb structure portion 210. However, in the present embodiment, each of the second electrode layer 222a and the third electrode layer 223a has a lower electrical resistance in the axial direction, so that the present embodiment can increase a ratio of the electric current flowing through the second electrode layer 222a and the third electrode layer 223a in the axial direction. The electric current flowing through the second electrode layer 222a and the third electrode layer 223a in the axial direction can then reach the second electrode layer 222b and the third electrode layer 223b on the right side through the inside of the honeycomb structure portion 210, and then flow out from the terminal connecting portion 230b through the first electrode layer 221b on the right side.

Figure 6:
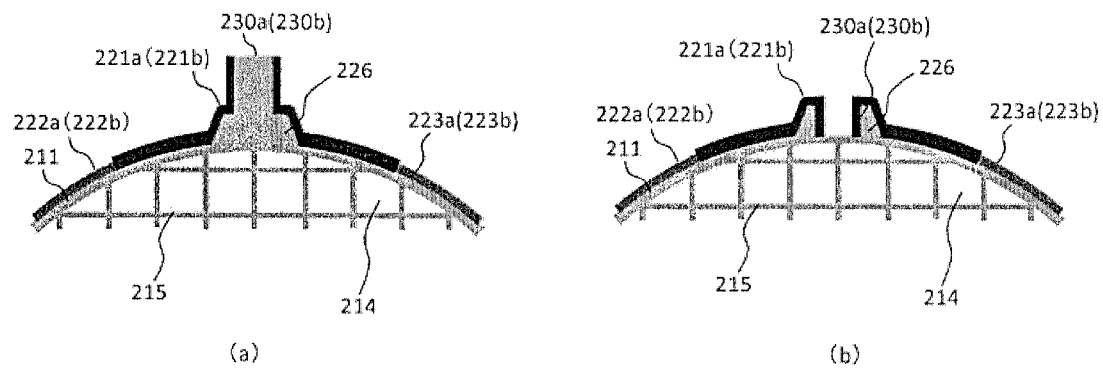
FIG. 6 is a schematic partial cross-sectional view of a honeycomb structure according to a second embodiment, which shows an example of a positional relationship among a first electrode layer, a second electrode layer and a third electrode layer, and a terminal connecting portion, for a case where an outer peripheral side wall of a honeycomb structure portion has protruding portions.

Referring to FIG. 6, the outer peripheral side wall 211 may have a pair of protruding portions 226 extending in the flow path direction of the cells 214, and one protruding portion in the pair of protruding portions 226 is disposed on a side opposite to the other protruding portion across the central axis of the honeycomb structure portion 210. Each of the pair of terminal connecting portions 230a, 230b on each of the pair of electrode portions 220a, 220b can be disposed at a portion where the protruding portion 226 is formed. In other words, the first electrode layer 221a, 221b can be disposed on the protruding portion 226. Since the portion of the outer peripheral side wall 211 having the pair of protruding portions 226 will have a relatively large thickness, the electrical resistance in the axial direction is lowered, so that the electric current flowing into the terminal connecting portion 230a, 230b will easily spread in the axial direction. This can help to improve the uniformity of heat generation.

In view of improvement of the uniformity of heat generation, it is preferable that the electric current uniformly flow from the first electrode layer to the second electrode layer and the third electrode layer. Therefore, it is desirable that a difference between $R_2$ and $R_3$ is as small as possible. Specifically, $0.8 \leq R_2/R_3 \leq 1.2$ is preferable, and $0.9 \leq R_2/R_3 \leq 1.1$ is more preferable, and $R_2 = R_3$ is still more preferable.

It is desirable that the first electrode layer 221a, 221b extend over a length of 70% or less, and preferably 65% or less, and more preferably a length of 60% or less between both bottom surfaces of the honeycomb structure portion 210, from the viewpoint that the electric current easily flows in the circumferential direction of the first electrode layer 221a, 221b. However, if the width of the first electrode layer 221a, 221b is too short in the axial direction, the uniformity of heat generation in the axial direction will be impaired. Therefore, it is desirable that the first electrode layer 221a, 221b extends over a length of 10% or more, and preferably a length of 15% or more, and more preferably a length of 20% or more between both bottom surfaces of the honeycomb structure portion 210.

On the other hand, It is desirable that the second electrode layer 222a, 222b and the third electrode layer 223a, 223b extend over a length of 80% or more, and preferably a length of 90% or more, and more preferably the entire length between both bottom surfaces of the honeycomb structure portion 210, from the viewpoint that the electric current easily flows in the axial direction of the second electrode layer 222a, 222b and the third electrode layer 223a, 223b.

A method for satisfying the above relationship for $R_2/R_{12}$ and $R_3/R_{13}$ includes, for example, a method for decreasing the electrical resistivity of the second electrode layer 222a, 222b and the third electrode layer 223a, 223b so that it is lower than the electrical resistivity of the first electrode layer 221a, 221b. In this case, $\rho_2/\rho_1 \leq 0.5$ and $\rho_3/\rho_1 \leq 0.5$ are preferably satisfied, $\rho_2/\rho_1 \leq 0.1$ and $\rho_3/\rho_1 \leq 0.1$ are more preferably satisfied, and $\rho_2/\rho_1 \leq 0.01$ and $\rho_3/\rho_1 \leq 0.01$ are even more preferably satisfied, and $\rho_2/\rho_1 \leq 0.005$ and $\beta_3/\beta_1 \leq 0.005$ are still more preferably satisfied, for example, $0.0001 \leq \rho_2/\rho_1 \leq 0.5$ and $0.0001 \leq \rho_3/\rho_1 \leq 0.5$ may be satisfied, in which $\rho_1$ is an electrical resistivity of the first electrode layer; $\rho_2$ is an electrical resistivity of the second electrode layer; and $\rho_3$ is an electrical resistivity of the third electrode layer.

Another method for satisfying the above relationship for $R_2/R_{12}$ and $R_3/R_{13}$ includes a method for changing the thicknesses of the first electrode layer, the second electrode layer and the third electrode layer. By decreasing the thickness of the first electrode layer larger so that it is smaller than that of the second electrode layer and the third electrode layer, the electrical resistance of the first electrode layer is heightened. However, since it is difficult to extremely increase the thickness difference, it has less degree of freedom than the electrical resistivity. By way of example, the relationships: $1.2 \leq T_2/T_1 \leq 5$ and $1.2 \leq T_3/T_1 \leq 5$ can be satisfied, in which $T_1$ is a thickness of the first electrode layer; $T_2$ is a thickness of the second electrode layer; and $T_3$ is a thickness of the third electrode layer. Since there is no need for adjusting the thickness if the electrical resistivity is adjusted, the thickness of the first electrode layer may be thicker than or equal to that of the second electrode layer and the third electrode layer.

Each of $T_1$, $T_2$, and $T_3$ may be preferably from 0.01 to 5 mm, and more preferably from 0.01 to 3 mm. Such a range can lead to improvement of the uniformity of heat generation. If $T_1$, $T_2$, and $T_3$ are smaller than 0.01 mm, the electrical resistance may become higher, which may not uniformly generate heat. If $T_1$, $T_2$, and $T_3$ are thicker than 5 mm, breakage may occur during canning.

A method for decreasing the difference between $R_2$ and $R_3$ includes a method for decreasing a difference between $\rho_2$ and $\rho_3$. Specifically, $0.8 \leq \rho_2/\rho_3 \leq 1.2$ is preferable, $0.9 \leq \rho_2/\rho_3 \leq 1.1$ is more preferable, and $\rho_2 = \rho_3$ is still more preferable. If $\rho_2$ and $\rho_3$ are the same, the second electrode layer and the third electrode layer can be formed of the same material, so that costs for preparing the electrode forming raw materials can be reduced.

In view of improving the uniformity of heat generation, the honeycomb structure 200 is formed such that each of the pair of electrode portions 220a, 220b is arranged in line symmetry with a straight line C connecting the respective circumferential centers of the pair of the electrode portions 220*a*, 220*b*, as an axis of symmetry, when the honeycomb structure 200 is observed in any cross section orthogonal to the flow path direction of the cells 214 (see FIG. 4).

Referring now to FIG. 4, in the cross section orthogonal to the flow direction of the cells, a central angle α formed by the two line segments connecting each of the side ends of electrode layer 220*a*, 220*b* in the circumferential direction to the central axis O may be preferably 30° or more, and more preferably 40° or more, and still more preferably 60° or more, in terms of spreading the electric current in the circumferential direction to enhance the uniformity of heat generation. However, if the central angle α is too large, the electric current passing through the inside of the honeycomb structure portion 210 will be decreased, and the electric current passing near the outer peripheral side wall 211 will be increased. Therefore, the central angle α may be preferably 140° or less, and more preferably 130° or less, and still more preferably 120° or less, in terms of the uniformity of heat generation of the honeycomb structure portion 210.

In terms of improving the uniformity of heat generation, at least a part of the terminal connecting portion 230*a*, 230*b* is preferably disposed so as to be covered with the first electrode layer 221*a*, 221*b*, and more preferably disposed so as to be covered with the first electrode layer 221*a*, 221*b* at the central portion of the first electrode layer 221*a*, 221*b* in the circumferential direction.

The shape of the terminal connecting portion 230*a* (230*b*) is not particularly limited, and it may be, for example, provided so as to be convex on the outer peripheral side wall 211 of the honeycomb structured portion, as shown in FIGS. 5(*a*) and 6(*a*). At least a part of the convex terminal connecting portion 230*a* (230*b*) can be covered with the first electrode layer 221*a* (221*b*). In this case, for example, the terminal connecting portion and the terminal can be connected by clipping the terminal connecting portion covered with the first electrode layer with a clip type terminal, or by inserting a concave type terminal into the terminal connecting portion covered with the first electrode layer.

Further, as shown in FIGS. 5(*b*) and 6(*b*), the concave terminal connecting portion 230*a* (230*b*) can be disposed on the outer peripheral side wall 211 of the honeycomb structure portion. At least a part of the concave terminal connecting portion 230*a* (230*b*) can be covered with the first electrode layer 221*a* (221*b*). In this case, the terminal connecting portion and the terminal can be connected by inserting a convex terminal into the terminal connecting portion, for example.

It is preferable that the terminal connecting portion 230*a*, 230*b* have corrosion resistance because it is exposed to an exhaust gas atmosphere. Therefore, for example, the terminal connecting portion 230*a*, 230*b* can be made of an alloy containing at least one selected from the group consisting of Si, Cr, Fe, Co, Ni and Ti or ceramics containing SiC.

When the honeycomb structure portion is mainly based on a silicon-silicon carbide composite material or silicon carbide, it is preferable that the terminal connecting portion be also mainly based on the silicon-silicon carbide composite material or silicon carbide. When the terminal connecting portion is mainly based on the silicon-silicon carbide composite material or silicon carbide, the components of the honeycomb structure portion and those of the terminal connecting portion will be the same (or close to each other). Therefore, a thermal expansion coefficient of the terminal connecting portion will be the same (close) value as that of the honeycomb structure portion. Further, since the material of the honeycomb structure portion and that of the terminal connecting portion are the same (or close to each other), a bonding strength of the honeycomb structure portion to the terminal connecting portion is also increased. Therefore, even if thermal stress is applied to the honeycomb structure portion, it is possible to prevent the terminal connecting portion from peeling off from the honeycomb structure portion, or to prevent the joint portion between the terminal connection portion and the honeycomb structure portion from being damaged. As used herein, the phrase "mainly based on a silicon-silicon carbide composite material" means that the terminal connecting portion contains the silicon-silicon carbide composite material (total mass) in an amount of 90% by mass or more of the entire terminal connecting portion. Further, as used herein, the phrase "the terminal connecting portion is mainly based on silicon carbide" means that the terminal connecting portion contains silicon carbide (total mass) in an amount of 90% by mass or more of the entire terminal connecting portion.

3. Method for Producing Conductive Honeycomb Structure

Figure 7:
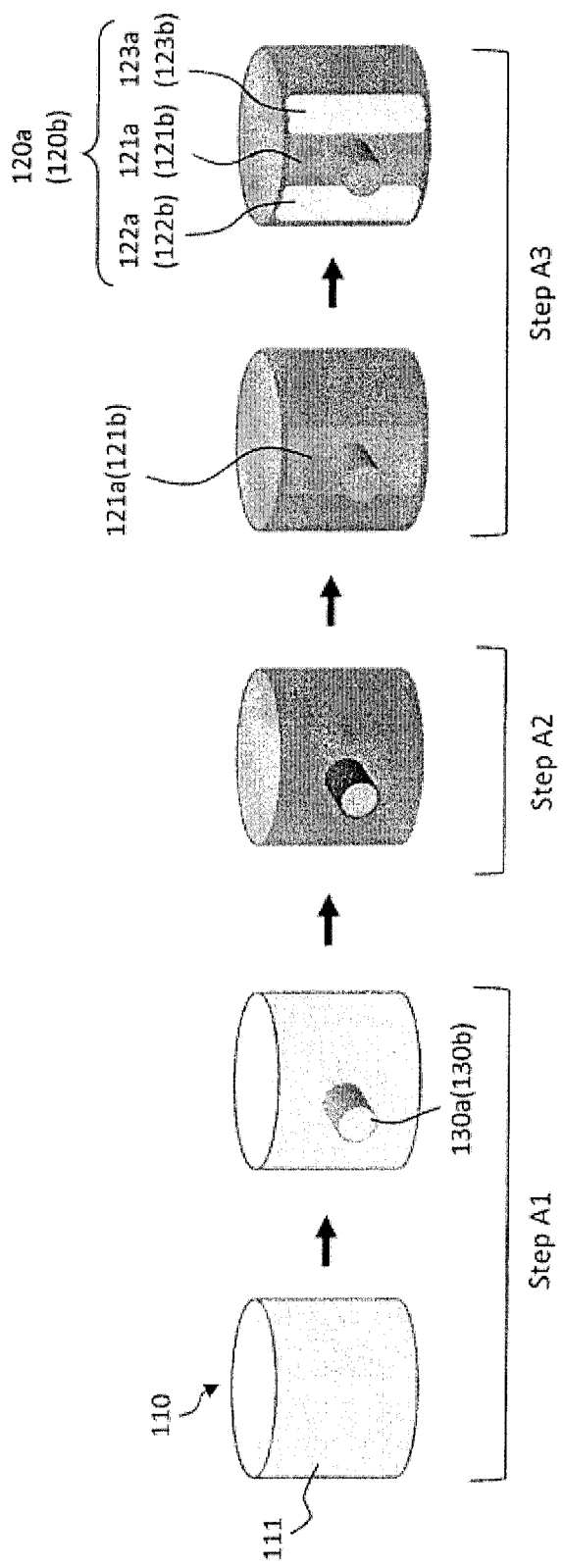
FIG. 7 is a schematic view for explaining an example of steps for producing a honeycomb structure according to the present invention.

Next, a method for producing the conductive honeycomb structure according to the present invention will be exemplarily described. In one embodiment, the method for producing the honeycomb structure according to the present invention includes a step A1 of obtaining an unfired honeycomb structure portion with terminal connecting portions, a step A2 of firing the unfired honeycomb structure portion with the terminal connecting portions to provide a fired honeycomb structure with terminal connecting portions, and a step A3 of forming electrode portions on the honeycomb structure portion with the terminal connecting portions (see FIG. 7).

In the step A1, a honeycomb formed body which is a precursor of the honeycomb structure portion is produced and terminal connecting portions are disposed on the side surface of the honeycomb formed body to provide an unfired honeycomb structure portion with the terminal connecting portions. As shown in FIG. 1, the honeycomb structure portion 110 includes: the partition walls 115 defining a plurality of cells 114 extending from the first end face 112 to the second end face 113; and the outer peripheral side wall 111 located at the outermost periphery.

The honeycomb formed body can be produced in accordance with a method for making a honeycomb formed body in the known method for producing the honeycomb structure. For example, firstly, a forming material is prepared by adding metallic silicon powder (metallic silicon), at least one binder, at least one surfactant, at least one pore former, water and the like to silicon carbide powder (silicon carbide). The mass of metallic silicon may be preferably from 10 to 40% by mass relative to the total mass of silicon carbide powder and metallic silicon. The average particle diameter of the silicon carbide particles in the silicon carbide powder may be preferably from 3 to 50 μm, and more preferably from 3 to 40 μm. The average particle diameter of metallic silicon in metallic silicon powder may be preferably from 2 to 35 μm. Each average particle diameter of the silicon carbide particles and metallic silicon particles refers to an arithmetic average diameter on volume basis when frequency distribution of the particle diameter is measured by a laser diffraction method. The silicon carbide particles are fine particles of silicon carbide constituting the silicon carbide powder, and the metallic silicon particles are fine particles of metallic silicon constituting the metallic silicon powder. It should be noted that this is the formulation of the forming material when the material of the honeycomb structure is the silicon-silicon carbide based composite material, and no metallic silicon is added when the material of the honeycomb structure is silicon carbide.

Examples of the binder include methyl cellulose, hydroxypropyl methyl cellulose, hydroxypropoxyl cellulose, hydroxyethyl cellulose, carboxymethyl cellulose, polyvinyl alcohol, and the like. Among them, it is preferable to use methyl cellulose in combination with hydroxypropoxyl cellulose. The content of the binder may be preferably from 2.0 to 10.0 parts by mass when the total mass of the silicon carbide powder and the metallic silicon powder is 100 parts by mass.

The content of water may be preferably from 20 to 60 parts by mass when the total mass of the silicon carbide powder and the metallic silicon powder is 100 parts by mass.

Examples of the surfactant that can be used include ethylene glycol, dextrin, fatty acid soap, polyalcohol and the like. These may be used alone or in combination with two or more. The content of the surfactant may be preferably from 0.1 to 2.0 parts by mass when the total mass of the silicon carbide powder and the metallic silicon powder is 100 parts by mass.

The pore former is not particularly limited as long as it will form pores after firing, and examples include graphite, starches, foaming resins, water absorbing resins, silica gel and the like. The content of the pore former may be preferably from 0.5 to 10.0 parts by mass when the total mass of the silicon carbide powder and the metallic silicon powder is 100 parts by mass. The average particle diameter of the pore former may be preferably from 10 to 30 µm. If it is smaller than 10 µm, pores may not be formed sufficiently. If it is larger than 30 µm, the pore former may be clogged in a die during forming. The average particle diameter of the pore former refers to an arithmetic average diameter on volume basis when the frequency distribution of the particle diameter is measured by the laser diffraction method. When the pore former is the water absorbing resin, the average particle diameter of the pore former refers to the average particle diameter after water absorption.

Subsequently, the resulting forming material is kneaded to form a green body, and the green body is then subjected to extrusion molding to prepare a honeycomb formed body. In the extrusion molding, a die having desired overall shape, cell shape, partition wall thickness, cell density and the like can be used. Preferably, the resulting honeycomb formed body is then subjected to drying. When the length of the honeycomb formed body in the central axis direction is not a desired length, both the bottom portions of the honeycomb formed body can be cut to the desired length. The dried honeycomb formed body is referred to as a honeycomb dried body.

Then, when forming the convex terminal connecting portion 130a (130b), a green body for forming the terminal connecting portions, for example, a green body using the same raw materials as those of the honeycomb formed body, is formed into a desired shape to prepare a pair of terminal connecting portions. The pair of terminal connecting portions 130a (130b) is attached to outer surface of the outer peripheral side wall 111, so as to be opposed to each other across the central axis of the honeycomb dried body. The attaching method includes a method for attaching the terminal connecting portion 130a (130b) to the outer surface by sandwiching a paste prepared by increasing an addition ratio of water using the same raw materials as those of the honeycomb formed body or the terminal connecting portions between the terminal connecting portion 130a (130b) and the outer surface of the outer peripheral side wall 111. Alternatively, concave terminal connecting portions may be formed by drilling portions of the outer peripheral side wall 111, so as to be opposed to each other across the central axis of the honeycomb dried body. In this case, the material of the concave terminal connecting portion is the same as that of the honeycomb structure portion. A terminal connecting portion-forming material may be further applied to the concave terminal connecting portions.

In the step A2, the unfired honeycomb structure portion with the terminal connecting portions is fired to obtain a fired honeycomb structure with terminal connecting portions. Before the firing, degreasing may be performed in order to remove the binder and the like. The firing may be preferably carried out by heating in an inert atmosphere such as nitrogen and argon at 1400 to 1500° C. for 1 to 20 hours. After the firing, an oxidation treatment may be preferably carried out at 1200 to 1350° C. for 1 to 10 hours in order to improve the durability. The degreasing and firing methods are not particularly limited, and may be carried out using an electric furnace, a gas furnace or the like.

In the step A3, the electrode portion 120a (120b) is formed on the fired honeycomb structure portion with the terminal connecting portions. The method for preparing the electrode portion-forming material and the method for forming the electrode portion-forming material on the fired honeycomb structure portion can be carried out in accordance with the known method for producing the honeycomb structure. In order to provide an electrical resistivity of the electrode portion lower than that of the honeycomb structure portion, the material of the electrode portions may be changed, or the content ratio of metallic silicon may be increased to be higher than the honeycomb structure portion, or the particle diameter of the metallic silicon particles may be decreased. After preparing the electrode portion-forming material, the composition of the electrode portion-forming material, the thickness of the electrode portions and the electrode portion-forming area are determined such that the first electrode layer 121a (121b), the second electrode layer 122a (122b), and the third electrode layer 123a (123b) as described above satisfy the conditions for the electrical resistance and the covering area explained earlier. Depending on the electrode portion-forming material, the electrode portion-forming material can be attached to the outer peripheral side wall 111 of the honeycomb structure portion by an appropriate method such as thermal spraying and coating. The electrode portion-attached portion may be fired as needed. By such a procedure, a pair of electrode portions provided so as to be on the outer surface of the outer peripheral side wall is formed across the central axis of the honeycomb structure portion.

EXAMPLES

Hereinafter, Examples will be illustrated for better understanding of the present invention and its advantages, but the present invention is not limited to the Examples.

First, the following materials were prepared as electrode layer-forming materials. The average particle diameter refers to an arithmetic average diameter on volume basis when the frequency distribution of the particle diameter is measured by the laser diffraction method.

(1) silver paste A: commercially available product;
(2) silver paste B: commercially available product;
(3) chromium silicide ($CrSi_2$) powder having an average particle diameter of 50 µm: commercially available product (hereinafter referred to as "$CrSi_2$ powder");
(4) mixed powder having a volume ratio of silicon (Si) with an average particle diameter of 60 µm and boron carbide ($B_4C$) with an average particle diameter of 50 μm, of Si:$B_4$C=98:2 (hereinafter referred to as "Si/$B_4$C powder");

(5) mixed powder A having a volume ratio of silicon (Si) powder with an average particle diameter of 60 μm and chromium boride (CrB) powder with an average particle diameter of 50 μm, of Si:CrB=82:18 (hereinafter referred to as "Si/CrB powder (A)");

(6) mixed powder B having a volume ratio of silicon (Si) powder with an average particle diameter of 60 μm and chromium boride (CrB) powder with an average particle diameter of 50 μm, of Si:CrB=95:5 (hereinafter referred to as "Si/CrB powder (B)"); and (7) mixed powder C having a volume ratio of silicon (Si) powder with an average particle diameter of 60 μm and chromium boride (CrB) powder with an average particle diameter of 50 μm, of Si:CrB=98:2 (hereinafter referred to as "Si/CrB powder (C)").

1. Test Relating to First Embodiment

Example 1-1

(1) Production of Honeycomb Dried Body

A ceramic raw material was prepared by mixing silicon carbide (SiC) powder and metallic silicon (Si) powder at a mass ratio of 60:40. To the ceramic raw material were added hydroxypropylmethyl cellulose as a binder and a water absorbing resin as a pore former, as well as water, to form a forming material. The forming material was then kneaded by a vacuum clay kneader to prepare a cylindrical green body. The content of the binder was 7 parts by mass when the total amount of silicon carbide (SiC) powder and metallic silicon (Si) powder was 100 parts by mass. The content of the pore former was 3 parts by mass when the total amount of silicon carbide (SiC) powder and metallic silicon (Si) powder was 100 parts by mass. The content of water was 42 parts by mass when the total amount of silicon carbide (SiC) powder and metallic silicon (Si) powder was 100 parts by mass. The average particle diameter of silicon carbide powder was 20 μm and the average particle diameter of metallic silicon powder was 6 μm. The average particle diameter of the pore former was 20 μm. Each average particle diameter of silicon carbide, metallic silicon and pore former refers to an arithmetic average diameter on volume basis when the frequency distribution of particle diameter is measured by the laser diffraction method.

The resulting cylindrical green body was formed using an extruder to provide a cylindrical honeycomb formed body including cells each having a square shape in the cross section. The resulting honeycomb formed body was subjected to high frequency induction heating for drying and then further dried at 120° C. for 2 hours by using a hot air drier, and predetermined amounts of both bottoms were cut to prepare a honeycomb dried body.

(2) Formation of Terminal Connecting Portion

Then, using a green body having the same composition as that of the honeycomb formed body, a pair of cylindrical terminal connecting portions was formed. Each of bottom surfaces of the pair of the cylindrical terminal connecting portions was attached to opposing outer surfaces of an outer peripheral side wall across the central axis of the honeycomb dried body to obtain an unfired honeycomb structure portion with terminal connecting portions.

(3) Firing

The resulting unfired honeycomb structure portion with the terminal connecting portions was degreased, fired and further oxidized to obtain a fired honeycomb structure portion with terminal connecting portions. The degreasing was carried out at 550° C. for 3 hours. The firing was carried out in an argon atmosphere at 1450° C. for 2 hours. The oxidation was carried out at 1300° C. for 1 hour.

(4) Formation of First Electrode Layer

Then, the silver paste A was used as a first electrode layer-forming material. The first electrode layer-forming material was applied to the outer surface of the outer peripheral side wall over the full length between both bottom surfaces of the fired honeycomb structure portion with the terminal connecting portions to form two band-shape first electrode layers each extending in the axial direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

(5) Formation of Second Electrode Layer and Third Electrode Layer

The Si/CrB powder (C) was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The thermal spraying of the second electrode layer- and third electrode layer-forming material was performed by plasma spraying under the following thermal spraying conditions. As a plasma gas, an Ar—$H_2$ mixed gas of Ar gas at 30 L/min and $H_2$ gas at 10 L/min was used. Then, a plasma electric current was 600 A, a plasma voltage was 60 V, a spraying distance was 150 mm, and an amount of spraying particles supplied was 30 g/min. Furthermore, in order to suppress oxidation of metal phases during the spraying, plasma frame was shielded with Ar gas.

(6) Specification of Honeycomb Structure

The honeycomb structure obtained by the above procedure had a substantially cylindrical shape, which had bottom surfaces each having a circular shape with a diameter of 100 mm and a length of 120 mm in the flow path direction of the cells. Each of the first electrode layer, the second electrode layer and the third electrode layer had "Width (Circumferential Direction)", "Width (Axial Direction)" and "Electrode Thickness" shown in Table 1.

The cell density was 93 cells/$cm^2$.

The thickness of each partition wall was 101.6 μm.

The average pore diameter (pore diameter) of each partition wall was 8.6 μm, and the porosity was 45%. The average pore diameter and the porosity are values measured by the mercury porosimeter.

The thickness of the outer peripheral side wall was 300 μm.

(7) Electrical Resistivity of Each Portion

The electrical resistivity of each of the honeycomb structure portion, the first electrode layer, the second electrode layer and the third electrode layer was measured by the following method. First, each sample having dimensions of 0.2 mm×4 mm×40 mm was prepared using the same material as each object to be measured. The silver paste was then applied onto the entire surfaces of both end portions (both end portions in the longitudinal direction) of the sample, and wired such that energization could be performed. A voltage applying electric current measuring device was connected to the sample, and a voltage was applied to the sample. A voltage of from 10 to 200 V was applied to the sample, an electric current value and a voltage value were measured in a state where a temperature of each sample was at 400° C., and the electrical resistivity was calculated from the resulting current value and voltage value as well as sample dimensions. The results are shown in Table 1.

(8) Electrical Resistance Ratio

In each of the pair of electrode portions of the honeycomb structure obtained by the above procedure, an electrical resistance $R_1$ at 400° C. between the terminal connecting portion and the surface point of the first electrode layer farthest from the terminal connecting portion in the flow path direction of the cells; an electrical resistance $R_2$ at 400° C. between the terminal connecting portion and the surface point of the second electrode layer farthest from the terminal connecting portion in the circumferential direction of the outer peripheral side wall; and an electrical resistance $R_3$ at 400° C. between the terminal connecting portion and the surface point of the third electrode layer farthest from the terminal connecting portion in the circumferential direction of the outer peripheral side wall, were measured with the four-probe method to obtain $R_1/R_2$ and $R_1/R_3$. In each of the pair of electrode portions, $R_1/R_2$ and $R_1/R_3$ were substantially the same. The results are shown in Table 1.

(9) Energization Test

The energization test was performed for the honeycomb structure obtained by the above procedure. In the energization test, temperatures of "Carrier Center", "Bottom Center" and "Terminal" were measured after one minute when terminals were connected to the pair of terminal connecting portions and the voltage was applied with 3 kW of input power. The results are shown in Table 1. The temperature of the "Carrier Center" refers to a temperature at an intersection between a straight line connecting the pair of terminal connecting portions and the central axis of the honeycomb structure portion. The temperature of the "Bottom Center" refers to a lower value of temperatures at intersections (two positions) between the central axis of the honeycomb structure portion and both bottom surfaces. The temperature of the "Terminal" refers to a higher value of temperatures at boundary portions (two portions) between the respective terminal connecting portions and the outer peripheral side wall.

Example 1-2

A fired honeycomb structure portion with terminal connecting portions the same as that of Example 1-1 was produced.

The $CrSi_2$ powder was used as a first electrode layer-forming material. The first electrode layer-forming material was plasma-sprayed onto the outer surface of the outer peripheral side wall over the full length between both bottom surfaces of the fired honeycomb structure portion with terminal connecting portions to form two band-shape first electrode layers each extending in the axial direction. In this case, the first electrode layer was formed such that the terminal connecting portions was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The Si/CrB powder (C) was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the first electrode layer, the second electrode layer and the third electrode layer were the same as those described in Example 1-1.

Each of the first electrode layer, the second electrode layer and the third electrode layer of the resulting honeycomb structure had "Width (Circumferential Direction)", "Width (Axial Direction)" and "Electrode Thickness" shown in Table 1. For the resulting honeycomb structure, the electrical resistivity and the electrical resistance ratio were determined and the energization test was conducted, in the same methods as those of Example 1-1. The results are shown in Table 1.

Example 1-3

A fired honeycomb structure portion with terminal connecting portions the same as that of Example 1-1 was produced.

The Si/CrB powder (A) was used as a first electrode layer-forming material. The first electrode layer-forming material was plasma-sprayed onto the outer surface of the outer peripheral side wall over the full length between both bottom surfaces of the fired honeycomb structure portion with terminal connecting portions to form two band-shape first electrode layers each extending in the axial direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The Si/CrB powder (C) was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the first electrode layer, the second electrode layer and the third electrode layer were the same as those described in Example 1-1.

Each of the first electrode layer, the second electrode layer and the third electrode layer of the resulting honeycomb structure had "Width (Circumferential Direction)", "Width (Axial Direction)" and "Electrode Thickness" shown in Table 1. For the resulting honeycomb structure, the electrical resistivity and the electrical resistance ratio were determined and the energization test was conducted, in the same methods as those of Example 1-1. The results are shown in Table 1.

Example 1-4

A fired honeycomb structure portion with terminal connecting portions the same as that of Example 1-1 was produced.

The Si/CrB powder (B) was used as a first electrode layer-forming material. The first electrode layer-forming material was plasma-sprayed onto the outer surface of the outer peripheral side wall over the full length between both bottom surfaces of the fired honeycomb structure portion with terminal connecting portions to form two band-shape first electrode layers each extending in the axial direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The Si/CrB powder (C) was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the first electrode layer, the second electrode layer and the third electrode layer were the same as those described in Example 1-1.

Each of the first electrode layer, the second electrode layer and the third electrode layer of the resulting honeycomb structure had "Width (Circumferential Direction)", "Width (Axial Direction)" and "Electrode Thickness" shown in Table 1. For the resulting honeycomb structure, the electrical resistivity and the electrical resistance ratio were determined and the energization test was conducted, in the same methods as those of Example 1-1. The results are shown in Table 1.

Example 1-5

A fired honeycomb structure with terminal connecting portions was produced under the same conditions as those of Example 1-1, with the exception that the mixing ratio of silicon in the materials for forming the honeycomb formed body and the terminal connecting portions was increased.

The Si/B$_4$C powder was used as a first electrode layer-forming material. The first electrode layer-forming material was plasma-sprayed onto the outer surface of the outer peripheral side wall over the full length between both bottom surfaces of the fired honeycomb structure portion with terminal connecting portions to form two band-shape first electrode layers each extending in the axial direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The Si/CrB powder (A) was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the first electrode layer, the second electrode layer and the third electrode layer were the same as those described in Example 1-1.

Each of the first electrode layer, the second electrode layer and the third electrode layer of the resulting honeycomb structure had "Width (Circumferential Direction)", "Width (Axial Direction)" and "Electrode Thickness" shown in Table 1. For the resulting honeycomb structure, the electrical resistivity and the electrical resistance ratio were determined and the energization test was conducted, in the same methods as those of Example 1-1. The results are shown in Table 1.

Example 1-6

A fired honeycomb structure with terminal connecting portions was produced under the same conditions as those of Example 1-1, with the exception that the mixing ratio of silicon in the materials for forming the honeycomb formed body and the terminal connecting portions was increased and the porosity was lowered to 35% by decreasing the particle diameter.

The silver paste B was used as a first electrode layer-forming material. The first electrode layer-forming material was applied onto the outer surface of the outer peripheral side wall over the full length between both bottom surfaces of a fired honeycomb structure portion with terminal connecting portions to form two band-shape first electrode layers each extending in the axial direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The $CrSi_2$ powder was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the second electrode layer and the third electrode layer were the same as those described in Example 1-1.

Each of the first electrode layer, the second electrode layer and the third electrode layer of the resulting honeycomb structure had "Width (Circumferential Direction)", "Width (Axial Direction)" and "Electrode Thickness" shown in Table 1. For the resulting honeycomb structure, the electrical resistivity and the electrical resistance ratio were determined and the energization test was conducted, in the same methods as those of Example 1-1. The results are shown in Table 1.

Example 1-7

(1) Production of Honeycomb Dried Body

A ceramic raw material was prepared by mixing tantalum silicide ($TaSi_2$) powder, metallic silicon (Si) powder and silicon carbide (SiC) powder at a mass ratio of $TaSi_2$:Si: SiC=84.4:11.3:4.2. To the ceramic raw material were added hydroxypropylmethyl cellulose as a binder and a water absorbing resin as a pore former, as well as water, to form a forming material. The forming material was then kneaded by a vacuum clay kneader to prepare a cylindrical green body. The content of the binder was 7 parts by mass when the total amount of tantalum oxide ($TaSi_2$) powder, metallic silicon (Si) powder and silicon carbide (SiC) powder was 100 parts by mass. The content of the pore former was 3 parts by mass when the total amount of tantalum oxide ($TaSi_2$) powder, metallic silicon (Si) powder and silicon carbide (SiC) powder was 100 parts by mass. The content of water was 42 parts by mass when the total amount of tantalum oxide ($TaSi_2$) powder, metallic silicon (Si) powder and silicon carbide (SiC) powder was 100 parts by mass. The $TaSi_2$ powder had an average particle diameter of 7 µm. The silicon powder had an average particle diameter of 6 µm. The silicon carbide powder had an average particle diameter of 35 µm. Each average particle diameter of the $TaSi_2$ powder, silicon powder and silicon carbide powder refers to an arithmetic average diameter on volume basis when the frequency distribution of particle diameter is measured by the laser diffraction method.

The resulting cylindrical green body was formed using an extruder to provide a cylindrical honeycomb formed body including cells each having a square shape in the cross section. The honeycomb formed body was subjected to high frequency induction heating and drying and then dried at 120° C. for 2 hours by using a hot air drier, and predetermined amounts of both bottoms were cut to prepare a honeycomb dried body.

(2) Formation of Terminal Connecting Portion

Then, using the same forming material as that of the honeycomb formed body, a pair of cylindrical terminal connecting portions was formed. Each of bottom surfaces of the pair of the cylindrical terminal connecting portions was attached to opposing outer surfaces of the outer peripheral side wall across the central axis of the honeycomb dried body to obtain an unfired honeycomb structure portion with terminal connecting portions.

(3) Firing

The resulting unfired honeycomb structure portion with the terminal connecting portions was degreased, fired and further oxidized to obtain a fired honeycomb structure portion with terminal connecting portions. The degreasing was carried out at 550° C. for 3 hours. The firing was carried out in an argon atmosphere at 1450° C. for 2 hours. The oxidation was carried out at 1300° C. for 1 hour.

(4) Formation of First Electrode Layer

Then, the silver paste A was used as a first electrode layer-forming material. The first electrode layer-forming material was applied onto the outer surface of the outer peripheral side wall over the full length between both bottom surfaces of the fired honeycomb structure portion with the terminal connecting portions to form two band-shape first electrode layers each extending in the axial direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

(5) Formation of Second Electrode Layer and Third Electrode Layer

The silver paste B was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

Each of the first electrode layer, the second electrode layer and the third electrode layer of the resulting honeycomb structure had "Width (Circumferential Direction)", "Width (Axial Direction)" and "Electrode Thickness" shown in Table 1.

For the resulting honeycomb structure, the electrical resistivity and the electrical resistance ratio were determined and the energization test was conducted, in the same methods as those of Example 1-1. The results are shown in Table 1.

Comparative Example 1-1

A fired honeycomb structure portion with terminal connecting portions the same as that of Example 1-1 was produced.

The Si/CrB powder (C) was used as a first electrode layer-forming material. The first electrode layer-forming material was plasma-sprayed onto the outer surface of the outer peripheral side wall over the full length between both bottom surfaces of the fired honeycomb structure portion with terminal connecting portions to form two band-shape first electrode layers each extending in the axial direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The Si/CrB powder (C) was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the first electrode layer, the second electrode layer and the third electrode layer were the same as those described in Example 1-1.

Each of the first electrode layer, the second electrode layer and the third electrode layer of the resulting honeycomb structure had "Width (Circumferential Direction)", "Width (Axial Direction)" and "Electrode Thickness" shown in Table 1. For the resulting honeycomb structure, the electrical resistivity and the electrical resistance ratio were determined and the energization test was conducted, in the same methods as those of Example 1-1. The results are shown in Table 1.

Comparative Example 1-2

A fired honeycomb structure portion with terminal connecting portions the same as that of Example 1-1 was produced.

The Si/CrB powder (B) was used as a first electrode layer-forming material. The first electrode layer-forming material was plasma-sprayed onto the outer surface of the outer peripheral side wall over the full length between both bottom surfaces of the fired honeycomb structure portion with terminal connecting portions to form two band-shape first electrode layers each extending in the axial direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The Si/CrB powder (C) was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the first electrode layer, the second electrode layer and the third electrode layer were the same as those described in Example 1-1.

Each of the first electrode layer, the second electrode layer and the third electrode layer of the resulting honeycomb structure had "Width (Circumferential Direction)", "Width (Axial Direction)" and "Electrode Thickness" shown in Table 1. For the resulting honeycomb structure, the electrical resistivity and the electrical resistance ratio were determined and the energization test was conducted, in the same methods as those of Example 1-1. The results are shown in Table 1.

Comparative Example 1-3

(1) Production of Honeycomb Dried Body
The same honeycomb formed body as that of Example 1-1 was obtained.

(2) Formation of Terminal Connecting Portion
As second electrode layer- and third electrode layer-forming material, the same forming material as that of the honeycomb formed body were used. The second electrode layer-forming material and the third electrode layer-forming material were applied onto the outer surface of the outer peripheral side wall of the honeycomb formed body at positions adjacent to respective circumferential ends of the pair of first electrode layers to be formed so as to have a positional relationship opposite to each other across the central axis of the honeycomb formed body, over the full length between both bottom surfaces of the honeycomb formed body, to form band-shape second and third electrode layers each extending in the axial direction.

(3) Formation of Terminal Connecting Portion
Using the same forming material as that of the honeycomb formed body, a pair of cylindrical terminal connecting portions was formed. Each of bottom surfaces of the pair of the cylindrical terminal connecting portions was attached to opposing outer surfaces of an outer peripheral side wall across the central axis of the honeycomb dried body to obtain an unfired honeycomb structure portion with terminal connecting portions. The attachment position of the terminal connecting portion was the central portion in the axial direction and circumferential direction of the first electrode layer to be formed.

(4) Firing

The resulting unfired honeycomb structure portion with the terminal connecting portions was degreased, fired and further oxidized to obtain a fired honeycomb structure portion with terminal connecting portions. The degreasing was carried out at 550° C. for 3 hours. The firing was carried out in an argon atmosphere at 1450° C. for 2 hours. The oxidation was carried out at 1300° C. for 1 hour.

(5) Formation of First Electrode Layer

The Si/CrB powder (B) was used as a first electrode layer-forming material. The first electrode layer-forming material was plasma-sprayed onto the outer surface of the outer peripheral side wall over the full length between both bottom surfaces of a fired honeycomb structure portion with terminal connecting portions to form two band-shape first electrode layers each extending in the axial direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The plasma spraying conditions of the first electrode layer were the same as those described in Example 1-1.

Each of the first electrode layer, the second electrode layer and the third electrode layer of the resulting honeycomb structure had "Width (Circumferential Direction)", "Width (Axial Direction)" and "Electrode Thickness" shown in Table 1. For the resulting honeycomb structure, the electrical resistivity and the electrical resistance ratio were determined and the energization test was conducted, in the same methods as those of Example 1-1. The results are shown in Table 1.

TABLE 1

| | Honeycomb Structure Portion | | | |
|---|---|---|---|---|
| | Diameter [mm] | Full Length [mm] | Material | Resistivity [Ωcm] |
| Example 1-1 | 100 | 120 | Si/SiC | 1 |
| Example 1-2 | 100 | 120 | Si/SiC | 1 |
| Example 1-3 | 100 | 120 | Si/SiC | 1 |
| Example 1-4 | 100 | 120 | Si/SiC | 1 |
| Example 1-5 | 100 | 120 | Si/SiC | 0.1 |
| Example 1-6 | 100 | 120 | Si/SiC | 0.01 |
| Example 1-7 | 100 | 120 | $TaSi_2$/Si/SiC | 0.001 |
| Comparative Example 1-1 | 100 | 120 | Si/SiC | 1 |
| Comparative Example 1-2 | 100 | 120 | Si/SiC | 1 |
| Comparative Example 1-3 | 100 | 120 | Si/SiC | 1 |

| | First Electrode Layer | | | | |
|---|---|---|---|---|---|
| | Width (Circumferential Direction) [mm] | Width (Axial Direction) [mm] | Electrode Thickness [mm] | Material | Resistivity ρ1 [Ωcm] |
| Example 1-1 | 20 | 120 | 0.3 | Silver Paste A | 0.0001 |
| Example 1-2 | 20 | 120 | 0.3 | $CrSi_2$ Powder | 0.001 |
| Example 1-3 | 20 | 120 | 0.5 | Si/CrB Powder (A) | 0.01 |
| Example 1-4 | 20 | 120 | 1.5 | Si/CrB Powder (B) | 0.05 |
| Example 1-5 | 20 | 120 | 1.5 | Si/$B_4$C Powder | 0.005 |
| Example 1-6 | 20 | 120 | 1.5 | Silver Paste B | 0.0003 |
| Example 1-7 | 20 | 120 | 2 | Silver Paste A | 0.0001 |
| Comparative Example 1-1 | 20 | 120 | 0.5 | Si/CrB Powder (C) | 0.1 |
| Comparative Example 1-2 | 20 | 120 | 0.5 | Si/CrB Powder (B) | 0.05 |
| Comparative Example 1-3 | 20 | 120 | 0.5 | Si/CrB Powder (B) | 0.05 |

| | Second Electrode Layer | | | | |
|---|---|---|---|---|---|
| | Width (Circumferential Direction) [mm] | Width (Axial Direction) [mm] | Electrode Thickness [mm] | Material | Resistivity ρ2 [Ωcm] |
| Example 1-1 | 40 | 120 | 0.5 | Si/CrB Powder (C) | 0.1 |
| Example 1-2 | 40 | 120 | 0.5 | Si/CrB Powder (C) | 0.1 |
| Example 1-3 | 40 | 120 | 0.5 | Si/CrB Powder (C) | 0.1 |
| Example 1-4 | 40 | 120 | 0.4 | Si/CrB Powder (C) | 0.1 |
| Example 1-5 | 40 | 120 | 0.4 | Si/CrB Powder (A) | 0.01 |
| Example 1-6 | 40 | 120 | 0.5 | $CrSi_2$ Powder | 0.001 |
| Example 1-7 | 40 | 120 | 0.6 | Silver Paste B | 0.0003 |
| Comparative Example 1-1 | 40 | 120 | 0.5 | Si/CrB Powder (C) | 0.1 |
| Comparative Example 1-2 | 40 | 120 | 0.25 | Si/CrB Powder (C) | 0.1 |
| Comparative Example 1-3 | 40 | 120 | 0.5 | Si/SiC | 1 |

TABLE 1-continued

| | Third Electrode Layer | | | | |
|---|---|---|---|---|---|
| | Width (Circumferential Direction) [mm] | Width (Axial Direction) [mm] | Electrode Thickness [mm] | Material | Resistivity $\rho_3$ [$\Omega$cm] |
| Example 1-1 | 40 | 120 | 0.5 | Si/CrB Powder (C) | 0.1 |
| Example 1-2 | 40 | 120 | 0.5 | Si/CrB Powder (C) | 0.1 |
| Example 1-3 | 40 | 120 | 0.5 | Si/CrB Powder (C) | 0.1 |
| Example 1-4 | 40 | 120 | 0.4 | Si/CrB Powder (C) | 0.1 |
| Example 1-5 | 40 | 120 | 0.4 | Si/CrB Powder (A) | 0.01 |
| Example 1-6 | 40 | 120 | 0.5 | CrSi$_2$ Powder | 0.001 |
| Example 1-7 | 40 | 120 | 0.6 | Silver Paste B | 0.0003 |
| Comparative Example 1-1 | 40 | 120 | 0.5 | Si/CrB Powder (C) | 0.1 |
| Comparative Example 1-2 | 40 | 120 | 0.25 | Si/CrB Powder (C) | 0.1 |
| Comparative Example 1-3 | 40 | 120 | 0.5 | Si/SiC | 1 |

| | Electrical Resistance Ratio | | Honeycomb Structure Temperature during Energization | | |
|---|---|---|---|---|---|
| | $R_1/R_2$ | $R_1/R_3$ | Carrier Center [° C.] | Bottom Center [° C.] | Terminal [° C.] |
| Example 1-1 | 0.0025 | 0.0025 | 350 | 340 | 140 |
| Example 1-2 | 0.025 | 0.025 | 350 | 340 | 170 |
| Example 1-3 | 0.16 | 0.15 | 330 | 310 | 180 |
| Example 1-4 | 0.2 | 0.2 | 310 | 300 | 190 |
| Example 1-5 | 0.2 | 0.2 | 330 | 310 | 200 |
| Example 1-6 | 0.15 | 0.15 | 330 | 310 | 180 |
| Example 1-7 | 0.15 | 0.15 | 320 | 310 | 180 |
| Comparative Example 1-1 | 1.5 | 1.5 | 190 | 150 | 480 |
| Comparative Example 1-2 | 0.375 | 0.375 | 250 | 220 | 400 |
| Comparative Example 1-3 | 0.075 | 0.075 | 210 | 160 | 470 |

Discussion

From the results shown in Table 1, it is understood that Examples of the present invention have improved uniform heat generation as compared with Comparative Examples. In particular, Example 1-1 in which $R_1/R_2$ and $R_1/R_3$ were optimized had excellently uniform heat generation. In Comparative Example 1-1 and Comparative Example 1-2, heat generation was concentrated near the terminals due to large $R_1/R_2$ and $R_1/R_3$. In Comparative Example 1-3, $R_1/R_2$ and $R_1/R_3$ were appropriate, but the electrical resistivity of each of the second electrode layer and the third electrode layer was not lower than that of the honeycomb structure portion, so that heat generation did not spread in the circumferential direction.

2. Test Relating to Second Embodiment

Example 2-1

(1) Production of Honeycomb Dried Body

A fired honeycomb structure portion with terminal connecting portions the same as that of Example 1-1 was produced.

The Si/CrB powder (C) was used as a first electrode layer-forming material. The first electrode layer-forming material was plasma-sprayed onto an axial center portion of the outer surface of the outer peripheral side wall of the fired honeycomb structure portion with terminal connecting portions to form two band-shape first electrode layers each extending in the circumferential direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions. The plasma spraying conditions of the first electrode layer were the same as those described in Example 1-1.

The silver paste A was used as second electrode layer- and third electrode layer-forming material. The second electrode layer-forming material and the third electrode layer-forming material were applied onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

Each of the first electrode layer, the second electrode layer and the third electrode layer of the resulting honeycomb structure had "Width (Circumferential Direction)", "Width (Axial Direction)" and "Electrode Thickness" shown in Table 2. For the resulting honeycomb structure, the electrical resistivity was determined in the same method as that of Example 1-1. The results are shown in Table 2.

(2) Electrical Resistance Ratio

In each of the pair of electrode portions of the honeycomb structure obtained by the above procedure, an electrical resistance $R_{12}$ at 400° C. between the terminal connecting portion and the surface point $A_1$ of the first electrode layer farthest in the circumferential direction of the outer peripheral side wall from the terminal connecting portion toward the second electrode layer; an electrical resistance $R_2$ at 400° C. between the surface point $A_2$ of the second electrode layer closest to the terminal connecting portion in the circumferential direction of the outer peripheral side wall and the surface point $A_3$ of the second electrode layer farthest from the surface point $A_2$ in the flow path direction of the cells; an electrical resistance $R_{13}$ at 400° C. between the terminal connecting portion and the surface point $B_1$ of the first electrode layer farthest in the circumferential direction of the outer peripheral side wall from the connecting portion toward the third electrode layer; and an electrical resistance $R_3$ at 400° C. between the surface point $B_2$ of the third electrode layer closest to the terminal connecting portion in the circumferential direction of the outer peripheral side wall and the surface point $B_3$ of the third electrode layer farthest from the surface point $B_2$ in the flow path direction of the cells, were measured by the four-probe method to obtain $R_2/R_{12}$ and $R_3/R_{13}$. In each of the pair of electrode portions, $R_2/R_{12}$ and $R_3/R_{13}$ were substantially the same. The results are shown in Table 2.

(3) Energization Test

The energization test was performed for the honeycomb structure obtained by the above procedure. In the energization test, temperatures of "Carrier Center", "Bottom Center" and "Terminal" were measured after one minute when terminals were connected to the pair of terminal connecting portions and the voltage was applied with 3 kW of input power. The results are shown in Table 2.

Example 2-2

A fired honeycomb structure portion with terminal connecting portions the same as that of Example 1-1 was produced. The Si/CrB powder (C) was used as a first electrode layer-forming material. The first electrode layer-forming material was plasma-sprayed onto an axial center portion of the outer surface of the outer peripheral side wall of the fired honeycomb structure portion with terminal connecting portions to form two band-shape first electrode layers each extending in the circumferential direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The $CrSi_2$ powder was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the first electrode layer, the second electrode layer and the third electrode layer were the same as those described in Example 1-1. Each of the first electrode layer, the second electrode layer and the third electrode layer of the resulting honeycomb structure had "Width (Circumferential Direction)", "Width (Axial Direction)" and "Electrode Thickness" shown in Table 2.

For the resulting honeycomb structure, the electrical resistivity and the electrical resistance ratio were determined, and the energization test was also conducted, in the same methods as those of Example 2-1. The results are shown in Table 2.

Example 2-3

A fired honeycomb structure portion with terminal connecting portions the same as that of Example 1-1 was produced. The Si/CrB powder (C) was used as a first electrode layer-forming material. The first electrode layer-forming material was plasma-sprayed onto an axial center portion of the outer surface of the outer peripheral side wall of the fired honeycomb structure portion with terminal connecting portions to form two band-shape first electrode layers each extending in the circumferential direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The Si/CrB powder (A) was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the first electrode layer, the second electrode layer and the third electrode layer were the same as those described in Example 1-1. Each of the first electrode layer, the second electrode layer and the third electrode layer of the resulting honeycomb structure had "Width (Circumferential Direction)", "Width (Axial Direction)" and "Electrode Thickness" shown in Table 2. For the resulting honeycomb structure, the electrical resistivity and the electrical resistance ratio were determined, and the energization test was also conducted, in the same methods as those of Example 2-1. The results are shown in Table 2.

Example 2-4

A fired honeycomb structure portion with terminal connecting portions the same as that of Example 1-1 was produced. The Si/CrB powder (C) was used as a first electrode layer-forming material. The first electrode layer-forming material was plasma-sprayed onto an axial center portion of the outer surface of the outer peripheral side wall of the fired honeycomb structure portion with terminal connecting portions to form two band-shape first electrode layers each extending in the circumferential direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The Si/CrB powder (B) was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the first electrode layer, the second electrode layer and the third electrode layer were the same as those described in Example 1-1. Each of the first electrode layer, the second electrode layer and the third electrode layer of the resulting honeycomb structure had "Width (Circumferential Direction)", "Width (Axial Direction)" and "Electrode Thickness" shown in Table 2. For the resulting honeycomb structure, the electrical resistivity and the electrical resistance ratio were determined, and the energization test was also conducted, in the same methods as those of Example 2-1. The results are shown in Table 2.

Example 2-5

A fired honeycomb structure with terminal connecting portions was produced under the same conditions as those of Example 1-1, with the exception that the mixing ratio of silicon in the materials for forming the honeycomb formed body and the terminal connecting portions was increased.

The Si/CrB powder (A) was used as a first electrode layer-forming material. The first electrode layer-forming material was plasma-sprayed onto an axial center portion of the outer surface of the outer peripheral side wall of the fired honeycomb structure portion with terminal connecting portions to form two band-shape first electrode layers each extending in the circumferential direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The Si/$B_4$C powder was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the first electrode layer, the second electrode layer and the third electrode layer were the same as those described in Example 1-1. Each of the first electrode layer, the second electrode layer and the third electrode layer of the resulting honeycomb structure had "Width (Circumferential Direction)", "Width (Axial Direction)" and "Electrode Thickness" shown in Table 2. For the resulting honeycomb structure, the electrical resistivity and the electrical resistance ratio were determined, and the energization test was also conducted, in the same methods as those of Example 2-1. The results are shown in Table 2.

Example 2-6

A fired honeycomb structure with terminal connecting portions was produced under the same conditions as those of Example 1-1, with the exception that the mixing ratio of silicon in the materials for forming the honeycomb formed body and the terminal connecting portions was increased and the porosity was lowered to 35% by decreasing the particle diameter.

The $CrSi_2$ powder was used as a first electrode layer-forming material. The first electrode layer-forming material was plasma-sprayed onto an axial center portion of the outer surface of the outer peripheral side wall of the fired honeycomb structure portion with terminal connecting portions to form two band-shape first electrode layers each extending in the circumferential direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The silver paste B was used as second electrode layer- and third electrode layer-forming material. The second electrode layer-forming material and the third electrode layer-forming material were applied onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the first electrode layer were the same as those described in Example 1-1. Each of the first electrode layer, the second electrode layer and the third electrode layer of the resulting honeycomb structure had "Width (Circumferential Direction)", "Width (Axial Direction)" and "Electrode Thickness" shown in Table 2. For the resulting honeycomb structure, the electrical resistivity and the electrical resistance ratio were determined, and the energization test was also conducted, in the same methods as those of Example 2-1. The results are shown in Table 2.

Example 2-7

A fired honeycomb structure portion with terminal connecting portions the same as that of Example 1-7 was produced. The silver paste B was used as a first electrode layer-forming material. The first electrode layer-forming material was applied onto an axial center portion of the outer surface of the outer peripheral side wall of the fired honeycomb structure portion with terminal connecting portions to form two band-shape first electrode layers each extending in the circumferential direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The silver paste A was used as second electrode layer- and third electrode layer-forming material. The second electrode layer-forming material and the third electrode layer-forming material were applied onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

Each of the first electrode layer, the second electrode layer and the third electrode layer of the resulting honeycomb structure had "Width (Circumferential Direction)", "Width (Axial Direction)" and "Electrode Thickness" shown in Table 2. For the resulting honeycomb structure, the electrical resistivity and the electrical resistance ratio were determined, and the energization test was also conducted, in the same methods as those of Example 2-1. The results are shown in Table 2.

Comparative Example 2-1

A fired honeycomb structure portion with terminal connecting portions the same as that of Example 1-1 was produced. The Si/CrB powder (C) was used as a first electrode layer-forming material. The first electrode layer-forming material was plasma-sprayed onto an axial center portion of the outer surface of the outer peripheral side wall of the fired honeycomb structure portion with terminal connecting portions to form two band-shape first electrode layers each extending in the circumferential direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The Si/CrB powder (C) was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the first electrode layer, the second electrode layer and the third electrode layer were the same as those described in Example 1-1. Each of the first electrode layer, the second electrode layer and the third electrode layer of the resulting honeycomb structure had "Width (Circumferential Direction)", "Width (Axial Direction)" and "Electrode Thickness" shown in Table 2. For the resulting honeycomb structure, the electrical resistivity and the electrical resistance ratio were determined, and the energization test was also conducted, in the same methods as those of Example 2-1. The results are shown in Table 2.

Comparative Example 2-2

A fired honeycomb structure portion with terminal connecting portions the same as that of Example 1-1 was produced. The Si/CrB powder (C) was used as a first electrode layer-forming material. The first electrode layer-forming material was plasma-sprayed onto an axial center portion of the outer surface of the outer peripheral side wall of the fired honeycomb structure portion with terminal connecting portions to form two band-shape first electrode layers each extending in the circumferential direction. In this case, the first electrode layer was formed such that the terminal connecting portion was disposed at the central portion in the axial direction and circumferential direction of the first electrode layer, and the side surface of the cylindrical terminal connecting portion was covered with the first electrode layer. The two first electrode layers were disposed so as to have a positional relationship opposite to each other across the central axis of the fired honeycomb structure portion with the terminal connecting portions.

The Si/CrB powder (B) was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the first electrode layer, the second electrode layer and the third electrode layer were the same as those described in Example 1-1. Each of the first electrode layer, the second electrode layer and the third electrode layer of the resulting honeycomb structure had "Width (Circumferential Direction)", "Width (Axial Direction)" and "Electrode Thickness" shown in Table 2. For the resulting honeycomb structure, the electrical resistivity and the electrical resistance ratio were determined, and the energization test was also conducted, in the same methods as those of Example 2-1. The results are shown in Table 2.

Comparative Example 2-3

(1) Production of Honeycomb Dried Body

The same honeycomb formed body as that of Example 1-1 was produced.

(2) Formation of First Electrode Layer

As a first electrode layer-forming material, the same forming material as that of the honeycomb formed body was used. The first electrode layer-forming material was applied onto an axial center portion of the outer surface of the outer peripheral side wall of the honeycomb formed body to form two band-shape first electrode layers each extending in the circumferential direction. The two first electrode layers were disposed so as to have a positional relationship opposite to each other across the central axis of the fired honeycomb structure portion with terminal connecting portions.

(3) Formation of Terminal Connecting Portion

Then, using the same forming material as that of the honeycomb formed body, a pair of cylindrical terminal connecting portions was formed. Bottom surfaces of the respective cylindrical terminal connecting portions were attached to an axial and circumferential center portion of each first electrode layer to obtain an unfired honeycomb structure portion with terminal connecting portions.

(4) Firing

The resulting unfired honeycomb structure portion with the terminal connecting portions was degreased, fired and further oxidized to obtain a fired honeycomb structure portion with terminal connecting portions. The degreasing was carried out at 550° C. for 3 hours. The firing was carried out in an argon atmosphere at 1450° C. for 2 hours. The oxidation was carried out at 1300° C. for 1 hour.

(5) Formation of Second Electrode Layer and Third Electrode Layer

The Si/CrB powder (B) was used as second electrode layer- and third electrode layer-forming material. The second electrode layer-forming material and the third electrode layer-forming material were plasma-sprayed onto the outer surface of the outer peripheral side wall of the honeycomb structure portion with terminal connecting portions so as to be adjacent to each circumferential side end of the respective first electrode layers, over the full length between both bottom surfaces of the fired honeycomb structure portion with terminal connecting portions, to form band-shape second and third electrode layers each extending in the axial direction. In this case, respective boundary portions of the first electrode layer and the second electrode layer were brought into contact with each other, and respective boundary portions of the first electrode layer and the third electrode layer were brought into contact with each other.

The plasma spraying conditions of the second electrode layer and the third electrode layer were the same as those described in Example 1-1. Each of the first electrode layer, the second electrode layer and the third electrode layer of the resulting honeycomb structure had "Width (Circumferential Direction)", "Width (Axial Direction)" and "Electrode Thickness" shown in Table 2. For the resulting honeycomb structure, the electrical resistivity and the electrical resistance ratio were determined, and the energization test was also conducted, in the same methods as those of Example 2-1. The results are shown in Table 2.

TABLE 2

| | Honeycomb Structure Portion | | | |
|---|---|---|---|---|
| | Diameter [mm] | Full Length [mm] | | Resistivity [Ωcm] |
| Example 2-1 | 100 | 120 | Si/SiC | 1 |
| Example 2-2 | 100 | 120 | Si/SiC | 1 |
| Example 2-3 | 100 | 120 | Si/SiC | 1 |
| Example 2-4 | 100 | 120 | Si/SiC | 1 |
| Example 2-5 | 100 | 120 | Si/SiC | 0.1 |
| Example 2-6 | 100 | 120 | Si/SiC | 0.01 |
| Example 2-7 | 100 | 120 | $TaSi_2$/Si/SiC | 0.001 |
| Comparative Example 2-1 | 100 | 120 | Si/SiC | 1 |
| Comparative Example 2-2 | 100 | 120 | Si/SiC | 1 |
| Comparative Example 2-3 | 100 | 120 | Si/SiC | 1 |

TABLE 2-continued

| | First Electrode Layer | | | | |
|---|---|---|---|---|---|
| | Width (Circumferential Direction) [mm] | Width (Axial Direction) [mm] | Electrode Thickness [mm] | Material | Resistivity $\rho1$ [$\Omega$cm] |
| Example 2-1 | 60 | 60 | 0.5 | Si/CrB Powder (C) | 0.1 |
| Example 2-2 | 60 | 60 | 0.5 | Si/CrB Powder (C) | 0.1 |
| Example 2-3 | 60 | 60 | 0.5 | Si/CrB Powder (C) | 0.1 |
| Example 2-4 | 60 | 60 | 0.4 | Si/CrB Powder (C) | 0.1 |
| Example 2-5 | 60 | 60 | 0.15 | Si/CrB Powder (A) | 0.01 |
| Example 2-6 | 60 | 60 | 0.5 | CrSi$_2$ Powder | 0.001 |
| Example 2-7 | 60 | 60 | 0.6 | Silver Paste B | 0.0003 |
| Comparative Example 2-1 | 60 | 60 | 0.5 | Si/CrB Powder (C) | 0.1 |
| Comparative Example 2-2 | 60 | 60 | 0.5 | Si/CrB Powder (C) | 0.1 |
| Comparative Example 2-3 | 60 | 60 | 0.5 | Si/SiC | 1 |

| | Second Electrode Layer | | | | |
|---|---|---|---|---|---|
| | Width (Circumferential Direction) [mm] | Width (Axial Direction) [mm] | Electrode Thickness [mm] | Material | Resistivity $\rho2$ [$\Omega$cm] |
| Example 2-1 | 20 | 120 | 0.3 | Silver Paste A | 0.0001 |
| Example 2-2 | 20 | 120 | 0.3 | CrSi$_2$ Powder | 0.001 |
| Example 2-3 | 20 | 120 | 0.5 | Si/CrB Powder (A) | 0.01 |
| Example 2-4 | 20 | 120 | 2 | Si/CrB Powder (B) | 0.05 |
| Example 2-5 | 20 | 120 | 0.75 | Si/B$_4$C Powder | 0.005 |
| Example 2-6 | 20 | 120 | 1.5 | Silver Paste B | 0.0003 |
| Example 2-7 | 20 | 120 | 2 | Silver Paste A | 0.0001 |
| Comparative Example 2-1 | 20 | 120 | 0.5 | Si/CrB Powder (C) | 0.1 |
| Comparative Example 2-2 | 20 | 120 | 0.5 | Si/CrB Powder (B) | 0.05 |
| Comparative Example 2-3 | 20 | 120 | 0.5 | Si/CrB Powder (B) | 0.05 |

| | Third Electrode Layer | | | | |
|---|---|---|---|---|---|
| | Width (Circumferential Direction) [mm] | Width (Axial Direction) [mm] | Electrode Thickness [mm] | Material | Resistivity $\rho3$ [$\Omega$cm] |
| Example 2-1 | 20 | 120 | 0.3 | Silver Paste A | 0.0001 |
| Example 2-2 | 20 | 120 | 0.3 | CrSi$_2$ Powder | 0.001 |
| Example 2-3 | 20 | 120 | 0.5 | Si/CrB Powder (A) | 0.01 |
| Example 2-4 | 20 | 120 | 2 | Si/CrB Powder (B) | 0.05 |
| Example 2-5 | 20 | 120 | 0.75 | Si/B$_4$C Powder | 0.005 |
| Example 2-6 | 20 | 120 | 1.5 | Siler Paste B | 0.0003 |
| Example 2-7 | 20 | 120 | 2 | Silver Paste A | 0.0001 |
| Comparative Example 2-1 | 20 | 120 | 0.5 | Si/CrB Powder (C) | 0.1 |
| Comparative Example 2-2 | 20 | 120 | 0.5 | Si/CrB Powder (B) | 0.05 |
| Comparative Example 2-3 | 20 | 120 | 0.5 | Si/CrB Powder (B) | 0.05 |

| | Electrical Resistance Ratio | | Honeycomb Structure Temperature during Energization | | |
|---|---|---|---|---|---|
| | $R_1/R_{12}$ | $R_1/R_{13}$ | Carrier Center [° C.] | Bottom Center [° C.] | Terminal [° C.] |
| Example 2-1 | 0.003 | 0.003 | 350 | 340 | 150 |
| Example 2-2 | 0.033 | 0.033 | 350 | 340 | 170 |
| Example 2-3 | 0.2 | 0.2 | 320 | 310 | 200 |
| Example 2-4 | 0.2 | 0.2 | 320 | 300 | 200 |
| Example 2-5 | 0.2 | 0.2 | 320 | 300 | 200 |
| Example 2-6 | 0.2 | 0.2 | 320 | 300 | 200 |
| Example 2-7 | 0.2 | 0.2 | 310 | 300 | 200 |
| Comparative Example 2-1 | 2 | 2 | 170 | 140 | 500 |
| Comparative Example 2-2 | 1 | 1 | 220 | 170 | 450 |
| Comparative Example 2-3 | 0.1 | 0.1 | 140 | 100 | 520 |

Discussion

From the results shown in Table 2, it is understood that Examples of the present invention have improved uniform heat generation as compared with Comparative Examples. In particular, Example 2-1 in which $R_2/R_{12}$ and $R_3/R_{13}$ were optimized had excellently uniform heat generation. In Comparative Example 2-1 and Comparative Example 2-2, heat generation was concentrated near the terminals due to large $R_2/R_{12}$ and $R_3/R_{13}$. In Comparative Example 2-3, $R_2/R_{12}$ and $R_3/R_{13}$ were appropriate, but the electrical resistivity of the first electrode layer was not lower than that of the honeycomb structure portion, so that heat generation did not spread in the circumferential direction.

DESCRIPTION OF REFERENCE NUMERALS 100 honeycomb structure
110 honeycomb structure portion
111 outer peripheral side wall
112 first end face
113 second end face
114 cell
115 partition wall
120a, 120b electrode portion
121a, 121b first electrode layer
122a, 122b second electrode layer
123a, 123b third electrode layer
125 side surface
126 protruding portion
130a, 130b terminal connecting portion
200 honeycomb structure
210 honeycomb structure portion
211 outer peripheral side wall
212 first end face
213 second end face
214 cell
215 partition wall
220a, 220b electrode portion
221a, 221b first electrode layer
222a, 222b second electrode layer
223a, 223b third electrode layer
225 side surface
226 protruding portion
230a, 230b terminal connecting portion

What is claimed is:
1. A conductive honeycomb structure, comprising:
a pillar shape honeycomb structure portion having:
an outer peripheral side wall; and
partition walls extending through the pillar shape honeycomb structure from a first end face to a second end face to define a plurality of cells forming a through channel;
a pair of electrode portions disposed on an outer surface of the outer peripheral side wall, and one electrode portion in the pair of electrode portions being disposed on a side opposite to the other electrode portion across a central axis of the honeycomb structure portion; and
a pair of terminal connecting portions disposed on the outer peripheral side wall;
wherein each of the pair of electrode portions comprises a first electrode layer, a second electrode layer, and a third electrode layer;
each of the first, second and third electrode layers is shaped in a form of a band extending in a flow path direction of the cells,
each of the first, second and third electrode layers is disposed on the outer surface of the outer peripheral side wall,
the second electrode layer, the first electrode layer, and the third electrode layer are connected in series in a circumferential direction of the outer peripheral side wall in this order,
at least a part of the pair of terminal connecting portions is covered with the first electrode layer;
each of the pair of electrode portions has an electrical resistivity lower than the honeycomb structure portion; and the conductive honeycomb structure satisfies;

$R_1/R_2 \leq 0.2$ and $R_1/R_3 \leq 0.2$, in the above formulas, in each of the electrode portions,
$R_1$ is an electrical resistance between the terminal connecting portion and a surface point of the first electrode layer farthest from the terminal connecting portion in the flow path direction of the cells;
$R_2$ is an electrical resistance between the terminal connecting portion and a surface point of the second electrode layer farthest from the terminal connecting portion in the circumferential direction of the outer peripheral side wall; and
$R_3$ is an electrical resistance between the terminal connecting portion and a surface point of the third electrode layer farthest from the terminal connecting portion in the circumferential direction of the outer peripheral side wall.

2. The conductive honeycomb structure according to claim 1, wherein the conductive honeycomb structure satisfies;

$\rho_1/\rho_2 \leq 0.5$ and $\rho_1/\rho_3 \leq 0.5$, in which the above formulas,
$\rho_1$ is an electrical resistivity of the first electrode layer; $\rho_2$ is an electrical resistivity of the second electrode layer; and $\rho_3$ is an electrical resistivity of the third electrode layer.

3. The conductive honeycomb structure according to claim 1, wherein the conductive honeycomb structure satisfies $0.8 \leq \rho_2/\rho_3 \leq 1.2$.

4. The conductive honeycomb structure according to claim 1, wherein each of the pair of electrode portions is disposed on line symmetry with a straight line connecting respective centers in the circumferential direction of the pair of electrode portions as an axis of symmetry, in any of cross sections orthogonal to the flow path direction of the cells.

5. The conductive honeycomb structure according to claim 1, wherein the honeycomb structure portion has an electrical resistivity in a range of from 0.001 Ω·cm to 1 Ω·cm, and
each of the pair of electrode portions has an electrical resistivity in a range of from 0.0001 Ω·cm to 0.1 Ω·cm.

6. The conductive honeycomb structure according to claim 1, wherein
the outer peripheral side wall comprises a pair of protruding portions extending in the flow path direction of the cells, and
one protruding portion in the pair of protruding portions is disposed on a side opposite to the other protruding portion across a central axis of the honeycomb structure portion, and
wherein each of the pair of terminal connecting portions is disposed at a position where each of the pair of protruding portions is formed.

7. A conductive honeycomb structure, comprising:
a pillar shape honeycomb structure portion having:
an outer peripheral side wall; and
partition walls extending through the pillar shape honeycomb structure from a first end face to a second end face to define a plurality of cells forming a through channel;
a pair of electrode portions disposed on an outer surface of the outer peripheral side wall, and one electrode portion in the pair of electrode portions being disposed on a side opposite to the other electrode portion across a central axis of the honeycomb structure portion; and a pair of terminal connecting portions disposed on the outer peripheral side wall;

wherein each of the pair of electrode portions comprises:

a band-shape first electrode layer extending from one end, passing through the terminal connecting portion so as to cover at least a part of the terminal connecting portion, to the other end, in a circumferential direction of the outer peripheral side wall, while being in contact with the outer surface of the outer peripheral side wall;

a band-shape second electrode layer connected to one end of the first electrode layer and extending from the one end in a flow path direction of the cells while being in contact with the outer surface of the outer peripheral side wall; and a band-shape third electrode layer connected to the other end of the first electrode layer and extending from the other end in the flow path direction of the cells while being in contact with the outer surface of the outer peripheral sidewall;

each of the pair of electrode portions has an electrical resistivity lower than the honeycomb structure portion;

at least a part of the pair of terminal connecting portions is covered with the first band-shape electrode layer; and wherein the conductive honeycomb structure satisfies;

$R_2/R_{12} \leq 0.2$ and $R_3/R_{13} \leq 0.2$, in the above formulas, in each of the electrode portions, $R_{12}$ is an electrical resistance between the terminal connecting portion and a surface point $A_1$ of the first band-shape electrode layer farthest in the circumferential direction of the outer peripheral side wall from the terminal connecting portion toward the second band-shape electrode layer;

$R_2$ is an electrical resistance between a surface point $A_2$ of the band-shape second electrode layer closest to the terminal connecting portion in the circumferential direction of the outer circumference side wall and a surface point $A_3$ of the band-shape second electrode layer farthest from the surface point $A_2$ in the flow path direction of the cells;

$R_{13}$ is an electrical resistance between the terminal connecting portion and a surface point $B_1$ of the first band-shape electrode layer farthest in the circumferential direction of the outer peripheral side wall from the terminal connecting portion toward the third band-shape electrode layer; and $R_3$ is an electrical resistance between a surface point $B_2$ of the third band-shape electrode layer closest to the terminal connecting portion in the circumferential direction of the outer circumference side wall and a surface point $B_3$ of the third band-shape electrode layer farthest from the surface point $B_2$ in the flow path direction of the cells.

8. The conductive honeycomb structure according to claim 7, wherein the conductive honeycomb structure satisfies;

$\rho_2/\rho_1 \leq 0.5$ and $\rho_3/\rho_1 \leq 0.5$, in the above formulas, $\rho_1$ is an electrical resistivity of the first band-shape electrode layer; $\rho_2$ is an electrical resistivity of the second band-shape electrode layer; and $\rho_3$ is an electrical resistivity of the third band-shape electrode layer.

9. The conductive honeycomb structure according to claim 7, wherein the conductive honeycomb structure satisfies $0.8 \leq \rho_2/\rho_3 \leq 1.2$.

10. The conductive honeycomb structure according to claim 7, wherein each of the pair of electrode portions is disposed on line symmetry with a straight line connecting respective centers in the circumferential direction of the pair of electrode portions as an axis of symmetry, in any of cross sections orthogonal to the flow path direction of the cells.

11. The conductive honeycomb structure according to claim 7, wherein the honeycomb structure portion has an electrical resistivity in a range of from 0.001 Ω·cm to 1 Ω·cm, and each of pair of the electrode portions has an electrical resistivity in a range of from 0.0001 Ω·cm to 0.1 Ω·cm.

12. The conductive honeycomb structure according to claim 7, wherein the outer peripheral side wall comprises a pair of protruding portions extending in the flow path direction of the cells, and one protruding portion in the pair of protruding portions is disposed on a side opposite to the other protruding portion across a central axis of the honeycomb structure portion, and wherein each of pair of the terminal connecting portions disposed at a position where each of the pair of protruding portions is formed.

* * * * *